US009194316B2

(12) United States Patent
Miyamoto et al.

(10) Patent No.: US 9,194,316 B2
(45) Date of Patent: Nov. 24, 2015

(54) INTER-CYLINDER AIR-FUEL RATIO IMBALANCE DETERMINING APPARATUS FOR INTERNAL COMBUSTION ENGINE

(75) Inventors: Hiroshi Miyamoto, Susono (JP); Yasushi Iwazaki, Ebina (JP); Shuntaro Okazaki, Shizuoka-ken (JP); Kenji Suzuki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 679 days.

(21) Appl. No.: 13/612,310

(22) Filed: Sep. 12, 2012

(65) Prior Publication Data

US 2013/0073184 A1 Mar. 21, 2013

(30) Foreign Application Priority Data

Sep. 21, 2011 (JP) ................................ 2011-206152

(51) Int. Cl.

| | |
|---|---|
| ***G06F 7/00*** | (2006.01) |
| ***G06F 17/00*** | (2006.01) |
| ***F02D 41/00*** | (2006.01) |
| *F02D 41/14* | (2006.01) |

(52) U.S. Cl.

CPC ........ *F02D 41/0085* (2013.01); *F02D 41/1454* (2013.01); *F02D 41/1495* (2013.01); *F02D 41/1443* (2013.01); *F02D 41/1456* (2013.01)

(58) Field of Classification Search

CPC ............ F02D 41/1456; F02D 41/1443; F02D 41/1454; F02D 41/0085; F02D 41/1495; Y02T 10/47

USPC .................. 701/102, 104, 109; 123/672, 692; 73/114.72

See application file for complete search history.

(56) References Cited

U.S. PATENT DOCUMENTS

| | | | | |
|---|---|---|---|---|
| 7,802,563 | B2 * | 9/2010 | Behr et al. | 123/692 |
| 8,413,497 | B2 * | 4/2013 | Kayama et al. | 73/114.72 |
| 8,452,517 | B2 * | 5/2013 | Sawada et al. | 701/101 |
| 8,700,290 | B2 * | 4/2014 | Miyamoto et al. | 701/103 |
| 2011/0054761 | A1 | 3/2011 | Sawada et al. | |
| 2012/0173115 | A1 | 7/2012 | Sawada et al. | |

FOREIGN PATENT DOCUMENTS

| | | |
|---|---|---|
| JP | 2007-113515 A | 5/2007 |
| JP | 2008-180225 A | 8/2008 |

(Continued)

*Primary Examiner* — Mahmoud Gimie
*Assistant Examiner* — David Hamaoui
(74) *Attorney, Agent, or Firm* — Dinsmore & Shohl LLP

(57) ABSTRACT

An inter-cylinder air-fuel ratio imbalance determining apparatus for an internal combustion engine includes an air-fuel ratio sensor; fuel injection valves; an instructed fuel injection amount control unit; and an imbalance determination unit configured: to acquire a time-differential-value corresponding value that is an amount of change per predetermined time in an output value of the sensor or a detected air-fuel ratio represented by the output value; to acquire a positive gradient corresponding value based on a positive value of the time-differential-value corresponding value; to acquire a negative gradient corresponding value based on a negative value of the time-differential-value corresponding value; to determine an imbalance determination threshold based on a magnitude of a ratio of the negative gradient corresponding value to the positive gradient corresponding value; and to determine whether inter-cylinder air-fuel ratio imbalance has occurred by comparing a magnitude of the negative gradient corresponding value with the imbalance determination threshold.

4 Claims, 8 Drawing Sheets

(56) References Cited

FOREIGN PATENT DOCUMENTS

| | | | |
|---|---|---|---|
| JP | 2009-287544 | A | 12/2009 |
| JP | 2010-185371 | A | 8/2010 |
| JP | 2010-209682 | A | 9/2010 |
| JP | 2011-047332 | A | 3/2011 |
| WO | 2011001539 | A1 | 1/2011 |

* cited by examiner

INTER-CYLINDER AIR-FUEL RATIO IMBALANCE DETERMINING APPARATUS FOR INTERNAL COMBUSTION ENGINE

CROSS REFERENCE TO RELATED APPLICATIONS

This application claims priority to Japanese Patent Application No. 2011-206152 filed on Sep. 21, 2011, which is incorporated herein by reference in its entirety including the specification, drawings and abstract.

BACKGROUND OF THE INVENTION

1. Field of the Invention

The invention relates to "an inter-cylinder air-fuel ratio imbalance determining apparatus for an internal combustion engine" that is applied to a multi-cylinder internal combustion engine and determines (monitors/detects) that the imbalance in the air-fuel ratio of an air-fuel mixture supplied to each cylinder (an inter-cylinder air-fuel ratio imbalance, an inter-cylinder variation in air-fuel ratio, non-uniformity in air-fuel ratio among cylinders) becomes excessively large.

2. Description of Related Art

When a fuel injection characteristic of a fuel injection valve for supplying fuel mainly to a specific cylinder (a fuel injection valve for a specific cylinder) is different from that of a fuel injection valve for supplying fuel mainly to another cylinder (a fuel injection valve for another valve), an inter-cylinder air-fuel ratio imbalance state occurs. The fuel injection characteristic is a characteristic indicative of the ratio of the amount of actually injected fuel relative to an instructed fuel injection amount. When the inter-cylinder air-fuel ratio imbalance state has occurred due to the difference in fuel injection characteristic mentioned above, a difference in the air-fuel ratio of exhaust gas discharged from a plurality of cylinders is increased. According to a discharge order (consequently, according to an ignition order), the exhaust gas discharged from a plurality of cylinders of an engine sequentially reaches "an air-fuel ratio sensor disposed in an exhaust collection portion where exhaust gas from the plurality of cylinders is collected (an upstream air-fuel ratio sensor)". As a result, when the inter-cylinder air-fuel ratio imbalance state has occurred, as shown in FIG. 2, an output of an air-fuel ratio obtained based on the air-fuel ratio sensor (a detected air-fuel ratio, an upstream air-fuel ratio) significantly fluctuates.

To cope with this, one of known inter-cylinder air-fuel ratio imbalance determining apparatuses acquires a value corresponding to a change amount per unit time (a time-differential-value corresponding value, a gradient) of "an output value of an air-fuel ratio sensor or a detected air-fuel ratio" as an imbalance determination parameter. In addition, the determining apparatus compares the acquired imbalance determination parameter with an imbalance determination threshold to determine whether or not the inter-cylinder air-fuel ratio imbalance state has occurred based on the comparison result (e.g., see Japanese Patent Application Publication No. 2011-047332 (JP-2011-047332 A)).

Hereinafter, description will be made of the case where the inter-cylinder air-fuel ratio imbalance has occurred due to the characteristic of a fuel injection valve for a specific cylinder in which the fuel injection valve for the specific cylinder injects more fuel than a fuel injection valve for another cylinder. Hereinbelow, such inter-cylinder air-fuel ratio imbalance is also simply referred to as "rich imbalance".

FIG. 2 shows a waveform of a detected air-fuel ratio in the case where the rich imbalance has occurred. As can be seen from FIG. 2, when the exhaust gas of a specific cylinder (a cylinder causing the rich imbalance) reaches the air-fuel ratio sensor, the detected air-fuel ratio decreases relatively sharply (see Times t0 to t1). In this case, the number of specific cylinders is one and the number of the other cylinders is two or more (for example, when attention is paid to an in-line four-cylinder engine or one of banks of a V8 engine, the number of the other cylinders is three). Normally, when the rich imbalance has occurred, by the feedback control of the air-fuel ratio, the air-fuel ratios of the other cylinders are controlled to be slightly leaner than the stoichiometric air-fuel ratio, and the average of the air-fuel ratio of the air-fuel mixture supplied to the entire engine is maintained at the level of a target air-fuel ratio (e.g., the stoichiometric air-fuel ratio). As a result, when the exhaust gas of the other cylinders sequentially reaches the air-fuel ratio sensor after Time t1, the detected air-fuel ratio increases relatively gradually (see Times t1 to t2).

In order to perform the determination of the rich imbalance with improved accuracy, it is considered that "a negative gradient corresponding value" is acquired based on the magnitude of a time-differential-value corresponding value having a negative value (the magnitude of a negative gradient) among the time-differential-value corresponding values of the detected air-fuel ratio, and it is determined whether or not the inter-cylinder air-fuel ratio imbalance has occurred by determining whether or not the magnitude of the negative gradient corresponding value is larger than an imbalance determination threshold.

On the other hand, a V8 engine shown as an example in FIG. 1 includes first, third, fifth, and seventh cylinders in a left bank LB, and second, fourth, sixth, and eighth cylinders in a right bank RB. Branch portions of an exhaust manifold of the cylinders belonging to the left bank lead to a left-bank exhaust collection portion HK (L). Branch portions of an exhaust manifold of the cylinders belonging to the right bank lead to a right-bank exhaust collection portion HK (R).

A left-bank catalyst 43 is disposed in a left-bank exhaust passage downstream of the left-bank exhaust collection portion HK (L). A left-bank upstream air-fuel ratio sensor 66L is disposed in the left-bank exhaust passage at a position between the left-bank exhaust collection portion HK (L) and the left-bank catalyst 43.

A right-bank catalyst 53 is disposed in a right-bank exhaust passage downstream of the right-bank exhaust collection portion 1-1K (R). A right-bank upstream air-fuel ratio sensor 66R is disposed in the right-bank exhaust passage at a position between the right-bank exhaust collection portion HK (R) and the right-bank catalyst 53.

The ignition order (combustion order, discharge order) of an engine 10 is, e.g., #1, #8, #7, #3, #6, #5, #4, and #2, as shown in FIG. 3. Herein, "#N" denotes an N-th cylinder, and N is an integer of 1 to 8. The interval of the ignition (combustion of an air-fuel mixture) corresponds to a period required for rotation by crank angle of 90°.

In the engine 10 described above, when attention is paid to the left bank, the crank angle from the occurrence of the combustion in the first cylinder to the occurrence of the next combustion in the seventh cylinder is 180°, the crank angle from the occurrence of the combustion in the seventh cylinder to the occurrence of the next combustion in the third cylinder is 90°, the crank angle from the occurrence of the combustion in the third cylinder to the occurrence of the next combustion in the fifth cylinder is 180°, and the crank angle from the occurrence of the combustion in the fifth cylinder to the occurrence of the next combustion in the first cylinder is 270°.

Similarly, when attention is paid to the right bank, the crank angle from the occurrence of the combustion in the eighth cylinder to the occurrence of the next combustion in the sixth cylinder is 270°, the crank angle from the occurrence of the combustion in the sixth cylinder to the occurrence of the next combustion in the fourth cylinder is 180°, the crank angle from the occurrence of the combustion in the fourth cylinder to the occurrence of the next combustion in the second cylinder is 90°, and the crank angle from the occurrence of the combustion in the second cylinder to the occurrence of the next combustion in the eighth cylinder is 180°.

Thus, the intervals of the combustion in each bank are not identical, and therefore the intervals of the arrival of the exhaust gas at the exhaust collection portion and the upstream air-fuel ratio sensor (66L, 66R) in each bank are not identical.

On the other hand, a change in the output value of the air-fuel ratio sensor lags behind "a change in the air-fuel ratio of the exhaust gas reaching the air-fuel ratio". Accordingly, when time from the arrival of "the exhaust gas from one cylinder" at the vicinity of the air-fuel ratio sensor to the arrival of "the exhaust gas from another cylinder" at the vicinity of the air-fuel ratio sensor is short, "the exhaust gas of another cylinder" reaches the air-fuel ratio sensor before the output value of the air-fuel ratio sensor is reduced to the value corresponding to the air-fuel ratio of "the exhaust gas of one cylinder", and the output value of the air-fuel ratio sensor starts to increase. As a result, for example, as shown in FIG. 4, even when the fuel injection characteristic of the fuel injection valve is changed in the same manner, the magnitude of the negative gradient corresponding value is changed depending on "which cylinder the fuel injection valve belongs to".

More specifically, since the crank angle from the arrival of the exhaust gas of the fifth cylinder at the air-fuel ratio sensor to the arrival of the exhaust gas of the cylinder subsequent to the fifth cylinder in the discharge order (i.e., the first cylinder) at the air-fuel ratio sensor is 270°, the exhaust gas of the fifth cylinder stays around the air-fuel ratio sensor for a relatively long time period. Therefore, the negative gradient corresponding value becomes relatively large when the injection characteristic of the fuel injection valve of the fifth cylinder is changed.

In contrast to this, since the crank angle from the arrival of the exhaust gas of the first cylinder at the air-fuel ratio sensor to the arrival of the exhaust gas of the cylinder subsequent to the first cylinder in the discharge order (i.e., the seventh cylinder) at the air-fuel ratio sensor is 180° and, similarly, the crank angle from the arrival of the exhaust gas of the third cylinder at the air-fuel ratio sensor to the arrival of the exhaust gas of the cylinder subsequent to the third cylinder in the discharge order (i.e., the fifth cylinder) at the air-fuel ratio sensor is 180°, the negative gradient corresponding value has a medium magnitude when the injection characteristic of the fuel injection valve of the first or third cylinder is changed. In addition, since the crank angle from the arrival of the exhaust gas of the seventh cylinder at the air-fuel ratio sensor to the arrival of the exhaust gas of the cylinder subsequent to the seventh cylinder in the discharge order (i.e., the third cylinder) at the air-fuel ratio sensor is 90°, the exhaust gas of the seventh cylinder can stay around the air-fuel ratio sensor only for a short time period. Therefore, the negative gradient corresponding value becomes relatively small when the injection characteristic of the fuel injection valve of the seventh cylinder is changed.

As can be seen from this, for example, when the fuel injection characteristic of the fuel injection valve of the fifth cylinder is not changed to such a degree that it should be determined that "the inter-cylinder air-fuel ratio imbalance state has occurred", but the fuel injection characteristic thereof is a characteristic in which a slightly excessive amount of fuel is injected within the design tolerance of the fuel injection valve, the magnitude of the negative gradient corresponding value becomes large to some extent. The magnitude of the negative gradient corresponding value in this case takes a value extremely close to the negative gradient corresponding value obtained when the fuel injection characteristic of the fuel injection valve of the seventh cylinder is changed to such a degree that it should be determined that "the inter-cylinder air-fuel ratio imbalance state has occurred".

More specifically, as shown in FIG. 5, the magnitudes of the negative gradient corresponding values at points P1 and P2 at which it should be determined that the inter-cylinder air-fuel ratio imbalance state has occurred and the magnitude of the negative gradient corresponding value at a point P3 at which it should not be determined that the inter-cylinder air-fuel ratio imbalance state has occurred are almost the same. Therefore, when the magnitude of the negative gradient corresponding value indicated by a broken line is set as the imbalance determination threshold, it is determined (erroneously determined) that the state of the point P1 or P2 is the state in which the inter-cylinder air-fuel ratio imbalance has not occurred. In contrast to this, when the magnitude of the negative gradient corresponding value indicated by a one-dot chain line is set as the imbalance determination threshold, it is determined (erroneously determined) that the state of the point P3 is the state in which the inter-cylinder air-fuel ratio imbalance has occurred.

SUMMARY OF THE INVENTION

The invention provides an inter-cylinder air-fuel ratio imbalance determining apparatus that performs inter-cylinder air-fuel ratio imbalance determination with high accuracy even when the intervals of combustion are unequal in a plurality of cylinders that discharge exhaust gas reaching an air-fuel ratio sensor.

An inter-cylinder air-fuel ratio imbalance determining apparatus for an internal combustion engine according to an aspect of the invention is applied to a multi-cylinder internal combustion engine including a plurality of cylinders in which combustion occurs at unequal intervals. The inter-cylinder air-fuel ratio imbalance determining apparatus includes an air-fuel ratio sensor, a plurality of fuel injection valves, and an instructed fuel injection amount control unit.

The air-fuel ratio sensor is disposed at a portion of an exhaust passage of the engine. The portion is an exhaust collection portion where exhaust gas discharged from at least two of the plurality of cylinders (preferably three or more, and further preferably four to six) is collected, or the portion is downstream of the exhaust collection portion. The air-fuel ratio sensor is configured to output an output value corresponding to an air-fuel ratio of the exhaust gas passing through the portion at which the air-fuel ratio sensor is disposed.

Each of the plurality of fuel injection valves is disposed for a corresponding one of the at least two of the cylinders, and configured to inject fuel to be contained in an air-fuel mixture supplied to a combustion chamber of the corresponding one of the at least two of the cylinders. The fuel is injected in an amount corresponding to an instructed fuel injection amount.

The instructed fuel injection amount control unit is configured to control the instructed fuel injection amount such that an air-fuel ratio of the air-fuel mixture supplied to the combustion chamber of each of the at least two of the cylinders matches a target air-fuel ratio.

The inventors have found out that a cylinder that has longer time (larger crank angle) until the next discharge of exhaust gas results in the larger magnitude of a ratio of a negative gradient corresponding value to a positive gradient corresponding value (hereinafter, may be referred to as "the magnitude of a negative/positive gradient ratio") irrespective of the occurrence of rich imbalance. That is, as the time (crank angle) after the discharge of exhaust gas from a cylinder until the discharge of exhaust gas from a next cylinder is longer (larger), the magnitude of the ratio of the negative gradient corresponding value to the positive gradient corresponding value relating to the cylinder becomes larger, irrespective of the occurrence of rich imbalance. Thus, the inventors have found out that, as shown in FIG. 6, when the horizontal axis indicates the magnitude of the negative/positive gradient ratio and the vertical axis indicates the magnitude of the negative gradient corresponding value, it is possible to set an imbalance determination threshold for differentiating between the case where the rich imbalance has occurred and the case where the rich imbalance has not occurred, as indicated by a broken line.

Thus, the imbalance determination unit is configured: (i) to acquire a time-differential-value corresponding value that is an amount of change per predetermined time in the output value of the air-fuel ratio sensor or a detected air-fuel ratio that is an air-fuel ratio represented by the output value; (ii) to acquire a positive gradient corresponding value based on a positive value of the time-differential-value corresponding value, the positive gradient corresponding value changing in accordance with a magnitude of the positive value; (iii) to acquire a negative gradient corresponding value based on a negative value of the time-differential-value corresponding value, the negative gradient corresponding value changing in accordance with a magnitude of the negative value; (iv) to determine an imbalance determination threshold based on a magnitude of a ratio of the negative gradient corresponding value to the positive gradient corresponding value, the imbalance determination threshold changing in accordance with the magnitude of the ratio; (v) to determine that an inter-cylinder air-fuel ratio imbalance state has occurred when a magnitude of the negative gradient corresponding value is equal to or larger than the imbalance determination threshold; and (vi) to determine that the inter-cylinder air-fuel ratio imbalance state has not occurred when the magnitude of the negative gradient corresponding value is smaller than the imbalance determination threshold.

In this case, the imbalance determination unit may be configured to determine the imbalance determination threshold such that the imbalance determination threshold becomes larger as the magnitude of the ratio of the negative gradient corresponding value to the positive gradient corresponding value (i.e., the magnitude of the negative/positive gradient ratio) becomes larger.

According to this, it is possible to avoid the above-described erroneous determination only by determining the positive gradient corresponding value and the negative gradient corresponding value without identifying which cylinder has the fuel injection valve causing the rich imbalance. Therefore, it is possible to provide the inter-cylinder air-fuel ratio imbalance determining apparatus that determines whether or not the inter-cylinder air-fuel ratio imbalance state has occurred, with high accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, a description is given of an inter-cylinder air-fuel ratio imbalance determining apparatus (hereinafter also simply referred to as "a determining apparatus") for an internal combustion engine according to each embodiment of the invention with reference to the drawings. The determining apparatus is a part of an air-fuel ratio control apparatus that controls the air-fuel ratio of an air-fuel mixture supplied to the internal combustion engine (the air-fuel ratio of the engine), and also a part of a fuel injection amount control apparatus that controls the fuel injection amount.

Figure 1:
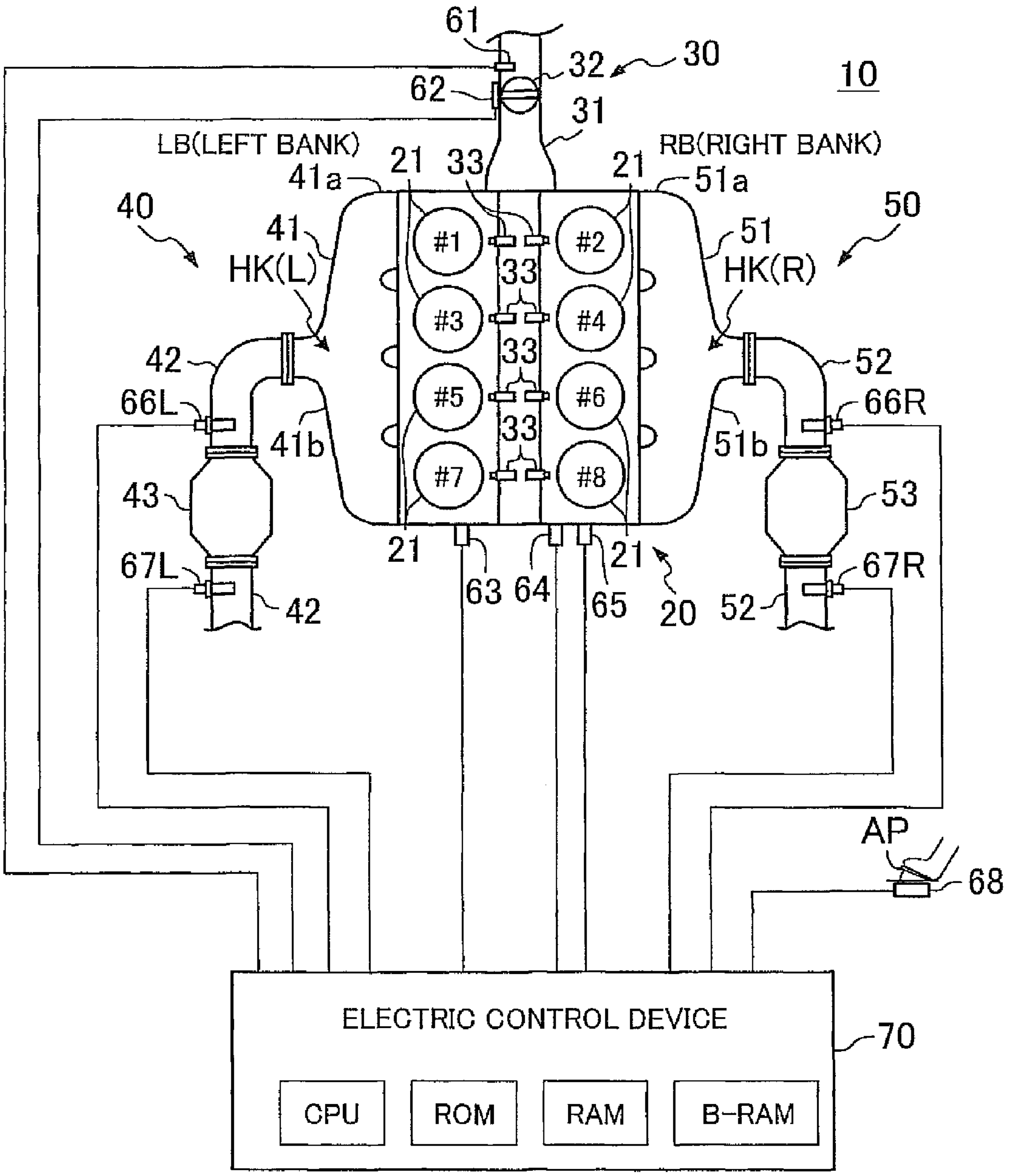
FIG. 1 is a schematic plan view of an internal combustion engine to which an inter-cylinder air-fuel ratio imbalance determining apparatus according to each embodiment of the invention is applied.
Figure 2:
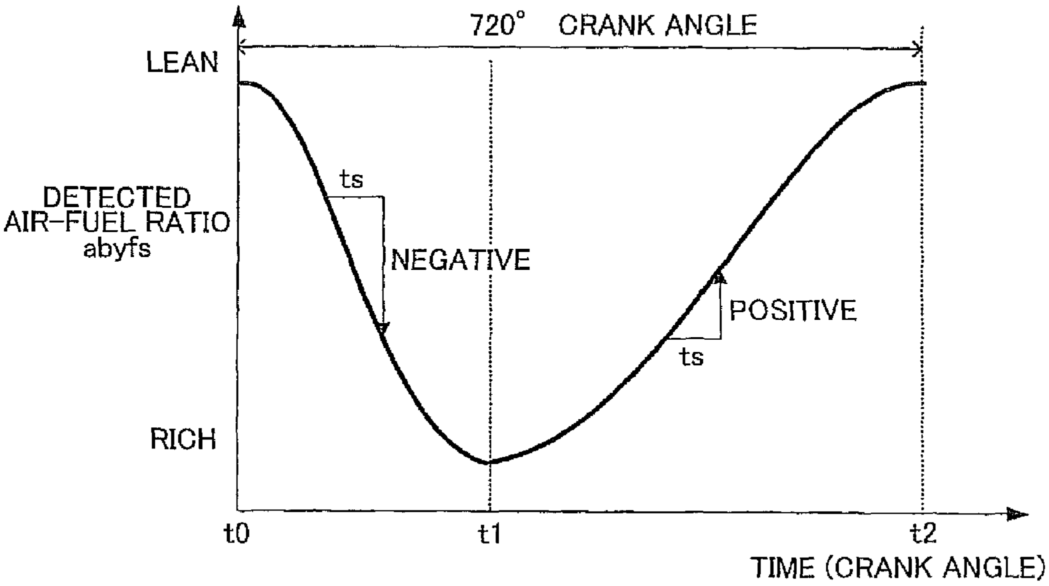
FIG. 2 is a graph showing a change in air-fuel ratio (detected air-fuel ratio) acquired based on an upstream air-fuel ratio sensor (air-fuel ratio sensor) when an inter-cylinder air-fuel ratio imbalance (rich imbalance) state has occurred.
Figure 3:
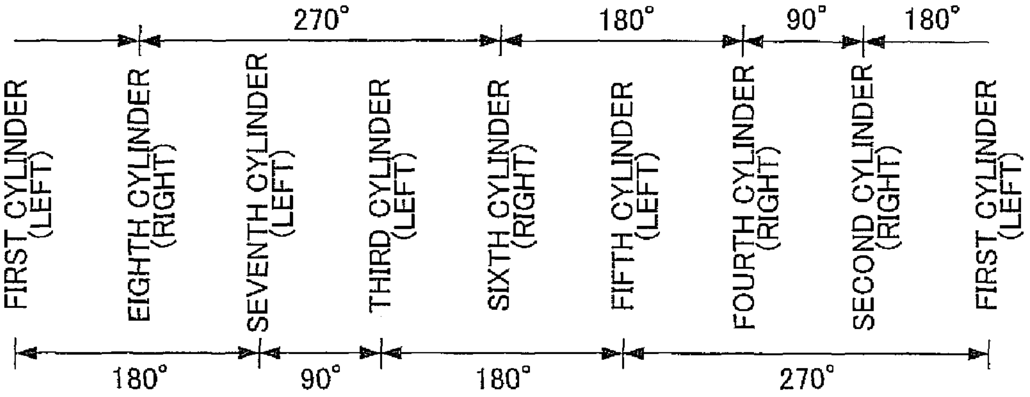
FIG. 3 is a view showing the discharge order (ignition order) of the engine shown in FIG. 1.
Figure 4:
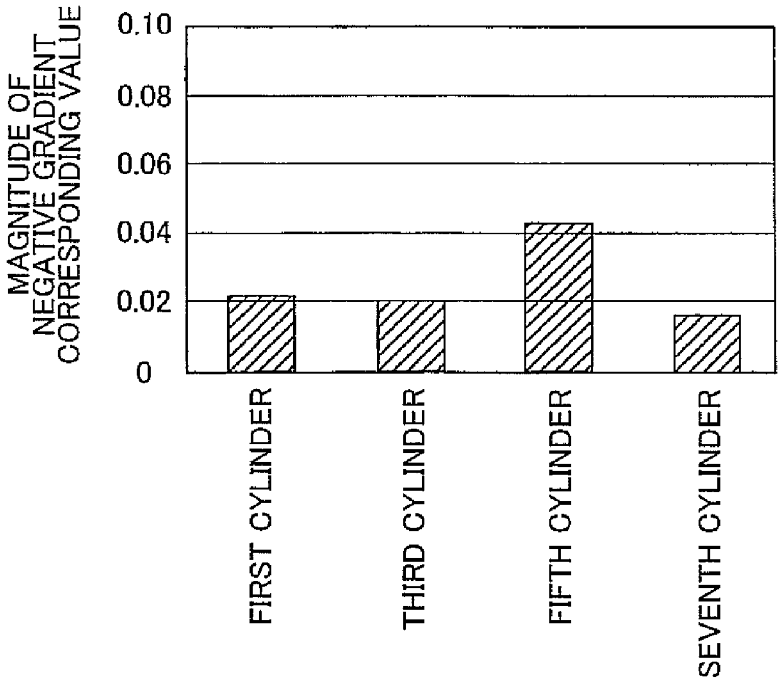
FIG. 4 is a graph showing the magnitude of a negative gradient corresponding value of the detected air-fuel ratio when each cylinder is brought into the same level of the rich imbalance state.
Figure 5:
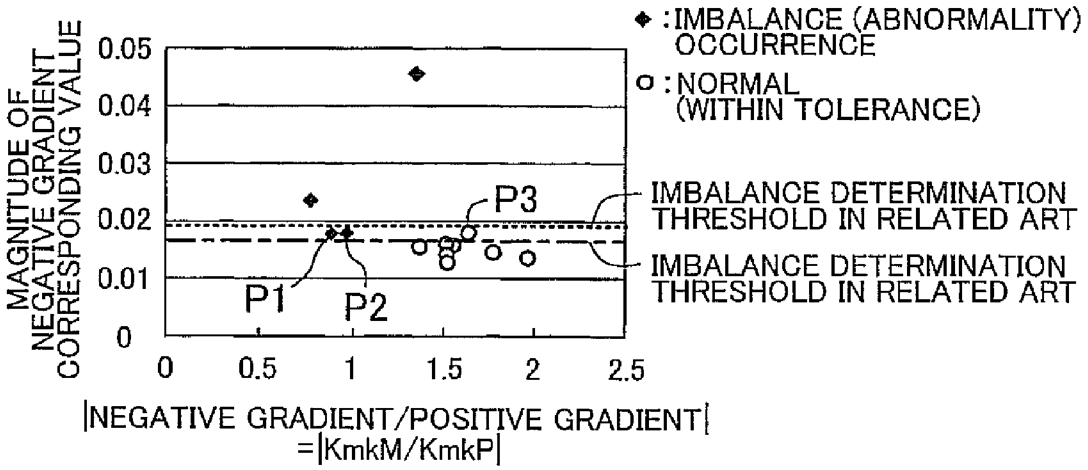
FIG. 5 RELATED ART
FIG. 5 is a graph having the vertical axis indicative of the magnitude of the negative gradient corresponding value of the detected air-fuel ratio and the horizontal axis indicative of the magnitude of the ratio of the negative gradient corresponding value relative to a positive gradient corresponding value of the detected air-fuel ratio (magnitude of a negative/positive gradient ratio)

First Embodiment (Configuration) FIG. 1 shows the schematic configuration of an internal combustion engine 10 to which a determining apparatus according to a first embodiment (hereinafter also referred to as "a first determining apparatus") is applied. The engine 10 is a four-cycle spark-ignition V8 engine (in which combustion occurs at unequal intervals). The engine 10 includes an engine main body portion 20, an intake system 30, a left-bank exhaust system 40, and a right-bank exhaust system 50.

The engine main body portion 20 includes a cylinder block portion and a cylinder head portion. The engine main body portion 20 has eight cylinders (combustion chambers) 21. A first cylinder (#1), a third cylinder (#3), a fifth cylinder (#5), and a seventh cylinder (#7) are provided in a left bank LB. A second cylinder (#2), a fourth cylinder (#4), a sixth cylinder (#6), and an eighth cylinder (#8) are provided in a right bank RB.

Each cylinder communicates with "an intake port and an exhaust port" that are not shown. The communication portion between the intake port and the combustion chamber 21 is opened and closed by an intake valve (not shown). The communication portion between the exhaust port and the combustion chamber 21 is opened and closed by an exhaust valve (not shown). A spark plug (not shown) is disposed in each combustion chamber 21.

The intake system 30 includes an intake passage portion 31 formed of an intake manifold and an intake pipe, a throttle valve 32, and a plurality of fuel injection valves 33.

At one end of the intake passage portion 31, an air filter (not shown) is provided. The other end of the intake passage portion 31 is divided into a plurality of branch portions (not shown), and the plurality of branch portions are respectively connected to a plurality of the intake ports.

The throttle valve 32 is rotatably disposed in the intake pipe of the intake passage portion 31. The throttle valve 32 is capable of changing the cross-sectional area of the opening of the intake passage portion 31. The throttle valve 32 is rotationally driven by a throttle valve actuator (not shown).

One fuel injection valve 33 is disposed in each cylinder (combustion chamber) 21. The fuel injection valve 33 is provided in the intake port. That is, each of the cylinders has the fuel injection valve 33 that performs fuel supply independently of the other cylinders. The fuel injection valve 33 responds to an injection instruction signal to inject "fuel in an instructed fuel injection amount included in the injection instruction signal" into the intake port (consequently, the cylinder 21 associated with the fuel injection valve 33) when the fuel injection valve 33 is normal.

The left-bank exhaust system 40 includes a left-bank exhaust manifold 41, a left-bank exhaust pipe 42, a left-bank upstream catalyst 43 disposed in the left-bank exhaust pipe 42, and "a downstream catalyst (not shown)" disposed in the left-bank exhaust pipe 42 at a position downstream of the left-bank upstream catalyst 43.

The left-bank exhaust manifold 41 includes a plurality of branch portions 41*a* and a collection portion 41*b*. One end of each of the plurality of branch portions 41*a* is connected to the exhaust port of a corresponding one of the plurality of cylinders belonging to the left bank LB. The other ends of the plurality of branch portions 41*a* lead to the collection portion 41*b*. The collection portion 41*b* is a portion where exhaust gas discharged from the plurality of (two or more, four in this embodiment, preferably three or more, and further preferably three to six) cylinders is collected, and hence the collection portion 41*b* is also referred to as a left-bank exhaust collection portion HK (L).

The left-bank exhaust pipe 42 is connected to the collection portion 41*b*. The exhaust ports of the cylinders belonging to the left bank LB, the left-bank exhaust manifold 41, and the left-bank exhaust pipe 42 constitute the left-bank exhaust passage.

Each of the left-bank upstream catalyst 43 and the left-bank downstream catalyst is what is called a three-way catalyst device (exhaust gas cleaning catalyst) supporting active components including noble metals (catalytic substance) such as platinum, rhodium, and palladium. Each catalyst has the function of oxidizing unburned components such as HC, CO, and $H_2$ and reducing nitrogen oxides ($NO_x$) when the air-fuel ratio of gas flowing into the catalyst is "the air-fuel ratio within the window of the three-way catalyst (e.g., the stoichiometric air-fuel ratio)". This function is also referred to as a catalytic function.

In addition, each catalyst has an oxygen storage function of storing oxygen. That is, when excessive oxygen is contained in the gas flowing into the catalyst (catalyst inflow gas), each catalyst stores the oxygen and cleans $NO_x$. When excessive unburned components are contained in the catalyst inflow gas, each catalyst releases the stored oxygen to clean the unburned components. This oxygen storage function is performed by an oxygen storage material such as ceria ($CeO_2$) or the like supported by the catalyst. Each catalyst is capable of cleaning the unburned component and the nitrogen oxide even when the air-fuel ratio is deviated from the stoichiometric air-fuel ratio by the oxygen storage function. That is, the width of the window is increased by the oxygen storage function.

The right-bank exhaust system 50 includes a right-bank exhaust manifold 51, a right-bank exhaust pipe 52, a right-bank upstream catalyst 53 disposed in the right-bank exhaust pipe 52, and "a downstream catalyst (not shown)" disposed in the right-bank exhaust pipe 52 at a position downstream of the right-bank upstream catalyst 53.

The right-bank exhaust manifold 51 includes a plurality of branch portions 51*a* and a collection portion 51*b*. One end of each of the plurality of branch portions 51*a* is connected to the exhaust port of a corresponding one of the plurality of cylinders belonging to the right bank RB. The other ends of the plurality of branch portions 51*a* lead to the collection portion 51*b*. The collection portion 51*b* is a portion where exhaust gas discharged from the plurality of (two or more, four in this embodiment, preferably three or more, and further preferably three to six) cylinders is collected, and hence the collection portion 51*b* is also referred to as a right-bank exhaust collection portion HK (R).

The right-bank exhaust pipe 52 is connected to the collection portion 51*b*. The exhaust ports of the cylinders belonging to the right bank RB, the right-bank exhaust manifold 51, and the right-bank exhaust pipe 52 constitute the right-bank exhaust passage.

Similarly to the left-bank upstream catalyst 43, the right-bank upstream catalyst 53 is the three-way catalyst. Similarly to the right-bank downstream catalyst, the left-bank downstream catalyst is also the three-way catalyst.

This system includes a hot-wire airflow meter 61, a throttle position sensor 62, a coolant temperature sensor 63, a crank position sensor 64, an intake cam position sensor 65, a left-bank upstream air-fuel ratio sensor 66L, a right-bank upstream air-fuel ratio sensor 66R, a left-bank downstream air-fuel ratio sensor 67L, a right-bank downstream air-fuel ratio sensor 67R, and an accelerator operation amount sensor 68.

The airflow meter 61 outputs a signal corresponding to a mass flow rate (intake air amount) Ga of intake air flowing in the intake passage portion 31. That is, the intake air amount Ga represents an intake air amount sucked in the engine 10 per unit time.

The throttle position sensor 62 detects an opening degree of the throttle valve 32 (throttle valve opening degree) and outputs a signal indicative of a throttle valve opening degree TA.

The coolant temperature sensor 63 detects the temperature of coolant of the engine 10 and outputs a signal indicative of a coolant temperature THW. The coolant temperature THW is an operation state index amount indicative of the warming-up state of the engine 10 (temperature of the engine 10).

The crank position sensor 64 outputs a signal having a narrow pulse at every 10° rotation of a crank shaft and a wide pulse at every 360° rotation of the crank shaft. This signal is converted to an engine rotation speed NE by an electric control device 70 described later.

The intake cam position sensor 65 outputs one pulse every time an intake cam shaft rotates by 90°, then 90°, and further 180° from a predetermined angle. The electric control device 70 described later acquires an absolute crank angle CA relative to the compression top dead center of a reference cylinder (e.g., the first cylinder) based on the signals from the crank position sensor 64 and the intake cam position sensor 65. The absolute crank angle CA is set to "0° crank angle" at the compression top dead center of the reference cylinder, is increased up to 720° crank angle in accordance with the rotation angle of the crank shaft, and is set to 0° crank angle again at this time point.

The left-bank upstream air-fuel ratio sensor 66L is disposed in "one of the left-bank exhaust manifold 41 and the left-bank exhaust pipe 42" at a position between the collection portion 41*b* (the exhaust collection portion HK (L)) of the left-bank exhaust manifold 41 and the left-bank upstream catalyst 43.

The left-bank upstream air-fuel ratio sensor 66L is "a limiting current type wide-range air-fuel ratio sensor having a diffusion resistance layer" disclosed in, e.g., each of Japanese Patent Application Publication No. 11-72473 (JP-11-72473 A), Japanese Patent Application Publication No. 2000-65782 (JP-2000-65782 A), and Japanese Patent Application Publication No. 2004-69547 (JP-2004-69547 A).

Figure 7:
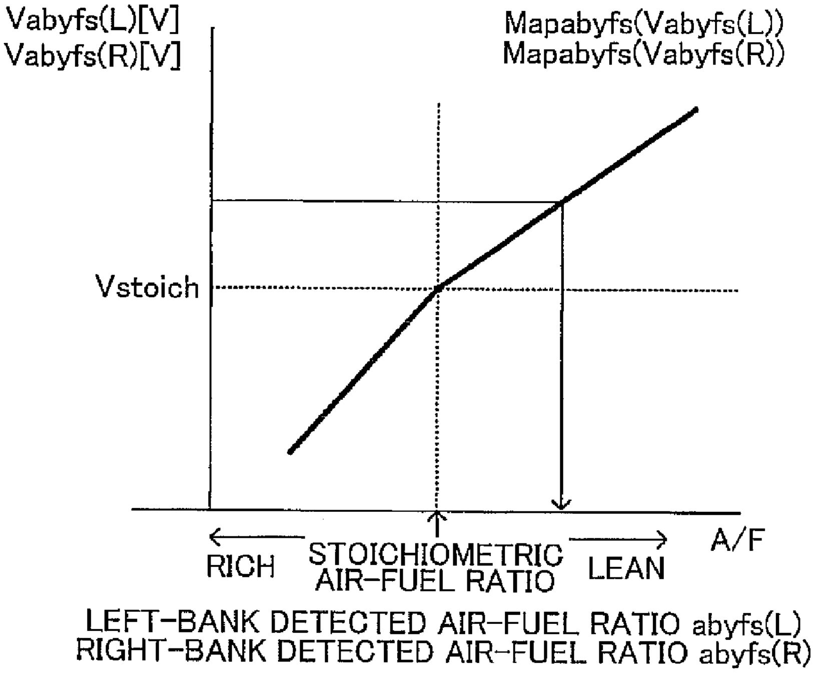
FIG. 7 is a graph showing the relationship between the air-fuel ratio of exhaust gas and an output value of the air-fuel ratio sensor (upstream air-fuel ratio sensor)

The left-bank upstream air-fuel ratio sensor 66L outputs an output value Vabyfs(L) corresponding to the air-fuel ratio of the exhaust gas flowing at the disposition position of the left-bank upstream air-fuel ratio sensor 66L (the air-fuel ratio of "a catalyst inflow gas" as the gas flowing into the left-bank catalyst 43, the left-bank upstream air-fuel ratio abyfs(L)=the left-bank detected air-fuel ratio abyfs(L)). As shown in FIG. 7, the output value Vabyfs(L) is increased as the air-fuel ratio abyfs(L) of the gas flowing into the left-bank catalyst 43 is increased (as the air-fuel ratio becomes leaner).

The electric control device 70 stores an air-fuel ratio conversion table (map) Mapabyfs that specifies the relationship between the output value Vabyfs(L) and the left-bank upstream air-fuel ratio abyfs(L) shown in FIG. 7. The electric control device 70 applies the output value Vabyfs(L) to the air-fuel ratio conversion table Mapabyfs to thereby detect the actual left-bank upstream air-fuel ratio abyfs(L) (acquires the left-bank detected air-fuel ratio abyfs(L)).

Referring to FIG. 1 again, the left-bank downstream air-fuel ratio sensor 67L is disposed in the left-bank exhaust pipe 42. The disposition position of the left-bank downstream air-fuel ratio sensor 67L is downstream of the left-bank upstream catalyst 43, and is upstream of the left-bank downstream catalyst (that is, the left-bank downstream air-fuel ratio sensor 67L is disposed at a position between the left-bank upstream catalyst 43 and the left-bank downstream catalyst in the exhaust passage). The left-bank downstream air-fuel ratio sensor 67L is a known electromotive force type oxygen concentration sensor (a known concentration cell type oxygen concentration sensor using a solid electrolyte such as stabilized zirconia or the like). The left-bank downstream air-fuel ratio sensor 67L generates an output value Voxs(L) corresponding to the air-fuel ratio of detection-target gas as the gas passing through the part in the exhaust passage where the left-bank downstream air-fuel ratio sensor 67L is disposed. In other words, the output value Voxs(L) is a value corresponding to the air-fuel ratio of the gas flowing out of the left-bank upstream catalyst 43 and flowing into the left-bank downstream catalyst.

Figure 8:
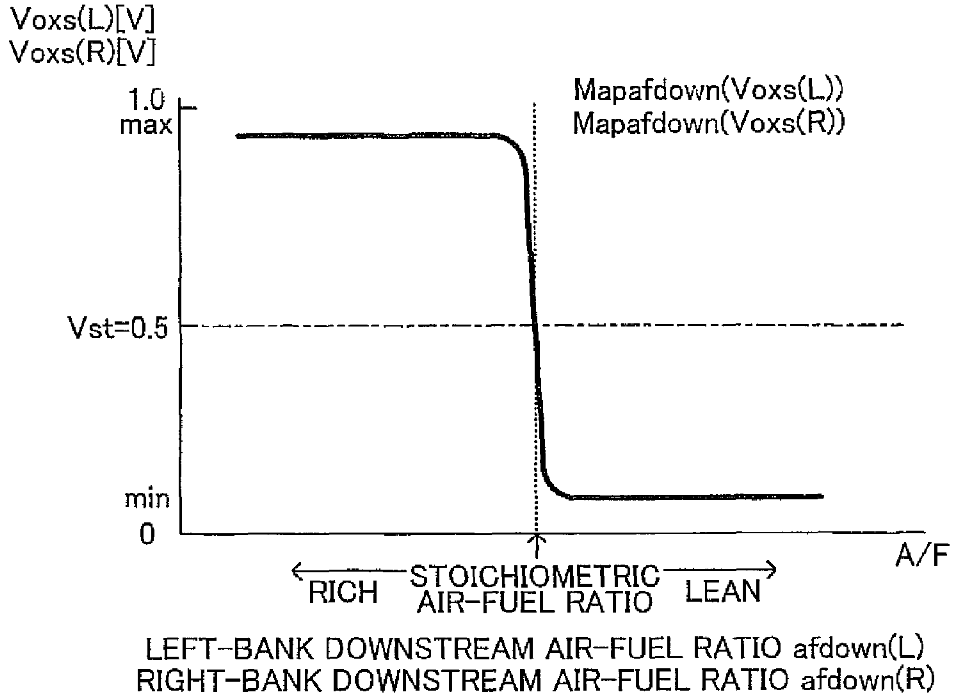
FIG. 8 is a graph showing the relationship between the air-fuel ratio of the exhaust gas and an output value of a downstream air-fuel ratio sensor.

As shown in FIG. 8, the output value Voxs(L) takes a maximum output value max (e.g., about 0.9 V to 1.0 V) when the air-fuel ratio of the gas flowing out of the left-bank upstream catalyst 43 is richer than the stoichiometric air-fuel ratio. The output value Voxs(L) takes a minimum output value min (e.g., about 0.1 V to 0 V) when the air-fuel ratio of the gas flowing out of the left-bank upstream catalyst 43 is leaner than the stoichiometric air-fuel ratio. In addition, the output value Voxs(L) takes a substantially intermediate voltage Vst (a middle value Vmid, an intermediate voltage Vst, e.g., about 0.5 V) between the maximum output value max and the minimum output value min when the air-fuel ratio of the gas flowing out of the left-bank upstream catalyst 43 is equal to the stoichiometric air-fuel ratio. The output value Voxs(L) sharply changes from the maximum output value max to the minimum output value min when the air-fuel ratio of the gas flowing out of the left-bank upstream catalyst 43 changes from the air-fuel ratio richer than the stoichiometric air-fuel ratio to the air-fuel ratio leaner than the stoichiometric air-fuel ratio. Similarly, the output value Voxs(L) sharply changes from the minimum output value min to the maximum output value max when the air-fuel ratio of the gas flowing out of the left-bank upstream catalyst 43 changes from the air-fuel ratio leaner than the stoichiometric air-fuel ratio to the air-fuel ratio richer than the stoichiometric air-fuel ratio.

Referring to FIG. 1 again, the right-bank upstream air-fuel ratio sensor 66R is disposed in "one of the right-bank exhaust manifold 51 and the right-bank exhaust pipe 52" at a position between the collection portion 51*b* (the exhaust collection portion HK (R)) of the right-bank exhaust manifold 51 and the right-bank upstream catalyst 53.

Similarly to the left-bank upstream air-fuel ratio sensor 66L, the right-bank upstream air-fuel ratio sensor 66R is "the limiting current type wide-range air-fuel ratio sensor having the diffusion resistance layer".

The right-bank upstream air-fuel ratio sensor 66R outputs an output value Vabyfs(R) corresponding to the air-fuel ratio of the exhaust gas flowing at the disposition position of the right-bank upstream air-fuel ratio sensor 66R (the air-fuel ratio of "the catalyst inflow gas" as the gas flowing into the right-bank catalyst 53, the right-bank upstream air-fuel ratio abyfs(R)=the right-bank detected air-fuel ratio abyfs(R)). As shown in FIG. 7, the output value Vabyfs(R) is increased as the air-fuel ratio of the gas flowing into the right-bank catalyst 53 is increased (as the air-fuel ratio becomes leaner).

The electric control device 70 stores the air-fuel ratio conversion table (map) Mapabyfs that specifies the relationship between the output value Vabyfs(R) and the right-bank upstream air-fuel ratio abyfs(R) shown in FIG. 7. The electric control device 70 applies the output value Vabyfs(R) to the air-fuel ratio conversion table Mapabyfs to thereby detect the actual right-bank upstream air-fuel ratio abyfs(R) (acquire the right-bank detected air-fuel ratio abyfs(R)).

Referring to FIG. 1 again, the right-bank downstream air-fuel ratio sensor 67R is disposed in the right-bank exhaust pipe 52. The disposition position of the right-bank downstream air-fuel ratio sensor 67R is downstream of the right-bank upstream catalyst 53, and is upstream of the right-bank downstream catalyst (that is, the right-bank downstream air-fuel ratio sensor 67R is disposed at a position between the right-bank upstream catalyst 53 and the right-bank downstream catalyst in the exhaust passage). Similarly to the left-bank downstream air-fuel ratio sensor 67L, the right-batik downstream air-fuel ratio sensor 67R is the electromotive force type oxygen concentration sensor.

The right-bank downstream air-fuel ratio sensor 67R generates an output value Voxs(R) corresponding to the air-fuel ratio of the detection-target gas as the gas passing through the part in the exhaust passage where the right-bank downstream air-fuel ratio sensor 67R is disposed (see FIG. 8).

The accelerator operation amount sensor 68 shown in FIG. 1 outputs a signal representing an operation amount Accp of an accelerator pedal AP operated by a driver (an accelerator pedal operation amount, an operation amount of the accelerator pedal AP). The accelerator pedal operation amount Accp is increased as the operation amount of the accelerator pedal AP is increased.

The electric control device 70 is a known microcomputer having "a CPU, a read only memory (ROM) pre-storing a program executed by the CPU, a table (map, function), and a constant, a random access memory (RAM) in which the CPU temporarily stores data on an as needed basis, a backup RAM (γ-RAM), and an interface including an analog-digital (AD) converter".

The backup RAM receives the supply of power from a battery mounted on a vehicle irrespective of the position (any of an OFF position, a start position, and an ON position) of an ignition key switch (not shown) of the vehicle on which the engine 10 is mounted. When receiving the supply of power from the battery, the backup RAM stores data (data is written) in response to the instruction of the CPU, and retains (contains) the data such that the data can be read. Accordingly, the backup RAM can retain the data even during the suspension of the operation of the engine 10.

When the supply of power from the battery is stopped due to the removal of the battery from the vehicle or the like, the backup RAM cannot retain the data. To cope with this, when the supply of power to the backup RAM is resumed, the CPU initializes the data to be retained in the backup RAM (i.e., sets the data to a default value). Note that the backup RAM may also be a random access nonvolatile memory such as an electrically erasable programmable read only memory (EEPROM) or the like.

The electric control device 70 is connected to the above-described sensors, and supplies signals from the sensors to the CPU. In addition, in response to the instruction of the CPU, the electric control device 70 sends drive signals (instruction signals) to the spark plug (actually an igniter) provided corresponding to each cylinder, the fuel injection valve 33 provided corresponding to each cylinder, and the throttle valve actuator.

Note that the electric control device 70 sends the instruction signal to the throttle valve actuator such that the throttle valve opening degree TA is increased as the acquired accelerator pedal operation amount Accp is increased. That is, the electric control device 70 includes a throttle valve drive portion that changes the opening degree of "the throttle valve 32 disposed in the intake passage of the engine 10" in accordance with the acceleration operation amount (the accelerator pedal operation amount Accp) of the engine 10 changed by a driver.

(Operation) Next, the operation of the first determining apparatus configured in the manner described above is described.

(Fuel Injection Amount Control) Every time the crank angle of an arbitrary cylinder reaches a predetermined crank angle before intake top dead center (e.g., BTDC90° CA), the CPU of the first determining apparatus repeatedly executes a fuel injection control routine shown in FIG. 9 on the cylinder (hereinafter also referred to as "a fuel injection cylinder"). Consequently, at a predetermined timing, the CPU starts the process from Step 900 and proceeds to Step 910 to acquire "an in-cylinder intake air amount Mc (k)" as "the air amount sucked in the fuel injection cylinder" based on "the intake air amount Ga measured by the airflow meter 61, the engine rotation speed NE acquired based on the signal of the crank position sensor 64, and a lookup table MapMc". The in-cylinder intake air amount Mc (k) is stored in the RAM in association with each intake stroke. The in-cylinder intake air amount Mc (k) may also be calculated using an available air model.

Next, the CPU proceeds to Step 920 to determine whether or not the fuel injection cylinder is a cylinder belonging to the left bank (any of #1, #3, #5, and #7). At this point, when the fuel injection cylinder is the cylinder belonging to the left bank, the CPU determines "Yes" in Step 920 and proceeds to Step 930 to determine a basic fuel injection amount Phase by dividing the in-cylinder intake air amount Mc (k) by a left-bank target air-fuel ratio abyfrL.

The left-bank target air-fuel ratio abyfrL is a value obtained by subtracting a left-bank sub-feedback amount KSFBL from the stoichiometric air-fuel ratio stoich (abyfrL=stoich−KSFBL).

The left-bank sub-feedback amount KSFBL is increased by a predetermined amount when the output value Voxs(L) of the left-bank downstream air-fuel ratio sensor 67L is smaller than the middle value Vmid as a downstream target value. As a result, the left-bank target air-fuel ratio abyfrL is reduced and the air-fuel ratio of the air-fuel mixture supplied to the cylinder of the left bank is reduced (changed to the rich side).

The left-bank sub-feedback amount KSFBL is reduced by a predetermined amount when the output value Voxs(L) of the left-bank downstream air-fuel ratio sensor 67L is larger than the middle value Vmid as the downstream target value. As a result, the left-bank target air-fuel ratio abyfrL is increased, and the air-fuel ratio of the air-fuel mixture supplied to the cylinder of the left bank is increased (changed to the lean side).

Next, the CPU proceeds to Step 940 to correct the basic fuel injection amount Fbase using a left-bank main feedback amount KFmainL. More specifically, the CPU calculates an instructed fuel injection amount (final fuel injection amount) Fi by multiplying the basic fuel injection amount Fbase by the left-bank main feedback amount KFmainL.

The left-bank main feedback amount KFmainL is calculated according to proportional-integral-derivative (HD) control such that the left-bank detected air-fuel ratio abyfs(L) acquired based on the output value Vabyfs(L) of the left-bank upstream air-fuel ratio sensor 66L matches the left-bank target air-fuel ratio abyfrL. Briefly speaking, when the left-bank detected air-fuel ratio abyfs(L) is larger than the left-bank target air-fuel ratio abyfrL (when it is lean), the left-bank main feedback amount KFmainL is increased by a predetermined amount. When the left-bank detected air-fuel ratio abyfs(L) is smaller than the left-bank target air-fuel ratio abyfrL (when it is rich), the left-bank main feedback amount KFmainL is reduced by a predetermined amount.

Note that, when a left-bank main feedback condition is satisfied, the left-bank main feedback amount KFmainL is updated, as described above. When the left-bank main feedback condition is not satisfied, the left-bank main feedback amount KFmainL is set to "1". The left-bank main feedback condition is satisfied when all of the following conditions are satisfied. (A1) The left-bank upstream air-fuel ratio sensor 66L is activated. (A2) A load of the engine (load factor) KL is equal to or smaller than a threshold KLth. (A3) Fuel-cut control is not performed.

Subsequently, the CPU proceeds to Step 950 to send an injection instruction signal for causing "the fuel in the instructed fuel injection amount Fi" to be injected from "the fuel injection valve 33 provided corresponding to the fuel injection cylinder" to the fuel injection valve 33.

As a result, if the fuel injection valve 33 of the fuel injection cylinder is normal, the fuel in the amount required to cause the air-fuel ratio of the cylinder belonging to the left bank to match the left-bank target air-fuel ratio abyfrL is injected from the fuel injection valve 33 of the fuel injection cylinder.

On the other hand, at the time point when the CPU performs the process in Step 920, when the fuel injection cylinder is the cylinder belonging to the right bank (any of #2, #4, #6, and #8), the CPU determines "No" in Step 920 and proceeds to Step 960 to determine the basic fuel injection amount Fbase by dividing the in-cylinder intake air amount Mc (k) by a right-bank target air-fuel ratio abyfrR.

The right-bank target air-fuel ratio abyfrR is a value obtained by subtracting a right-bank sub-feedback amount KSFBR from the stoichiometric air-fuel ratio stoich (abyfrR=stoich−KSFBR).

When the output value Voxs(R) of the right-bank downstream air-fuel ratio sensor 67R is smaller than the middle value Vmid as the downstream target value, the right-bank sub-feedback amount KSFBR is increased by a predetermined amount. As a result, the right-bank target air-fuel ratio abyfrR is reduced, and the air-fuel ratio of the air-fuel mixture supplied to the cylinder of the right bank is reduced (changed to the rich side).

When the output value Voxs(R) of the right-bank downstream air-fuel ratio sensor 67R is larger than the middle value Vmid as the downstream target value, the right-bank sub-feedback amount KSFBR is reduced by a predetermined amount. As a result, the right-bank target air-fuel ratio abyfrR is increased, and the air-fuel ratio of the air-fuel mixture supplied to the cylinder of the right bank is increased (changed to the lean side).

Then, the CPU proceeds to Step 970 to correct the basic fuel injection amount Fbase using a right-bank main feedback amount KFmainR. More specifically, the CPU calculates the instructed fuel injection amount (the final fuel injection amount) Fi by multiplying the basic fuel injection amount Fbase by the right-bank main feedback amount KFmainR.

The right-bank main feedback amount KFmainR is calculated according to PID control such that the right-bank detected air-fuel ratio abyfs(R) acquired based on the output value Vabyfs(R) of the right-bank upstream air-fuel ratio sensor 66R matches the right-bank target air-fuel ratio abyfrR. Briefly speaking, when the right-bank detected air-fuel ratio abyfs(R) is larger than the right-bank target air-fuel ratio abyfrR (when it is lean), the right-bank main feedback amount KFmainR is increased by a predetermined amount. When the right-bank detected air-fuel ratio abyfs(R) is smaller than the right-bank target air-fuel ratio abyfrR (when it is rich), the right-bank main feedback amount KFmainR is reduced by a predetermined amount.

Note that, when a right-bank main feedback condition is satisfied, the right-bank main feedback amount KFmainR is updated, as described above. When the right-bank main feedback condition is not satisfied, the right-bank main feedback amount KFmainR is set to "1". The right-bank main feedback condition is satisfied when all of the following conditions are satisfied. (B1) The right-bank upstream air-fuel ratio sensor 66R is activated. (B2) The load of the engine (load factor) KL is equal to or smaller than the threshold KLth. (B3) Fuel-cut control is not performed.

Next, the CPU proceeds to Step 950 to send the injection instruction signal for causing "the fuel in the instructed fuel injection amount Fi" to be injected from "the fuel injection valve 33 provided corresponding to the fuel injection cylinder" to the fuel injection valve 33.

As a result, if the fuel injection valve 33 of the fuel injection cylinder is normal, the fuel in the amount required to cause the air-fuel ratio of the cylinder belonging to the right bank to match the right-bank target air-fuel ratio abyfrR is injected from the fuel injection valve 33 of the fuel injection cylinder.

(Inter-Cylinder Air-Fuel Ratio Imbalance Determination)

Next, the process for executing "the inter-cylinder air-fuel ratio imbalance determination" is described. The CPU executes "an inter-cylinder air-fuel ratio imbalance determination routine" shown by a flowchart of FIG. 10 every time 4 ms (predetermined constant sampling time ts) elapses. Note that "the inter-cylinder air-fuel ratio imbalance determination routine" is a routine that determines whether or not the inter-cylinder air-fuel ratio imbalance state has occurred in the cylinders belonging to the left bank. The routine that determines whether or not the inter-cylinder air-fuel ratio imbalance state has occurred in the cylinders belonging to the right bank is the same as the routine shown in FIG. 10, and is executed separately.

At a predetermined timing, the CPU starts the process from Step 1000 and proceeds to Step 1005 to determine whether or not the value of a parameter acquisition permission flag Xkyoka is "1".

The value of the parameter acquisition permission flag Xkyoka is set to "1" when "an imbalance determination parameter acquisition condition" is satisfied at the time point when the absolute crank angle CA is 0° crank angle, and is set to "0" immediately at the time point when the imbalance determination parameter acquisition condition is not satisfied. The imbalance determination parameter acquisition condition is also simply referred to as "a parameter acquisition permission condition".

The parameter acquisition permission condition is satisfied when all of the following conditions (Conditions C1 to C5) are satisfied. Consequently, the parameter acquisition permission condition is not satisfied when at least one of the following conditions (Conditions C1 to C5) is not satisfied. It goes without saying that the condition constituting the parameter acquisition permission condition is not limited to the following Conditions C1 to C5.

(Condition C1) After the current start of the engine 10, the final result of the inter-cylinder air-fuel ratio imbalance determination for the left bank has not been obtained. Condition C1 is also referred to as an imbalance determination execution request condition. Condition C1 may be replaced by a condition that "the accumulated value of operation time of the engine 10 or the accumulated value of the intake air amount Ga" since the previous inter-cylinder air-fuel ratio imbalance determination for the left bank is equal to or larger than a predetermined value. (Condition C2) The intake air amount Ga acquired by the airflow meter 61 is within a predetermined range. (Condition C3) The engine rotation speed NE is within a predetermined range. That is, the engine rotation speed NE is equal to or higher than a low threshold rotation speed NELoth and equal to or lower than a high threshold rotation speed NEHith. (Condition C4) The coolant temperature THW is equal to or higher than a threshold coolant temperature THWth. (Condition C5) The left-bank main feedback condition is satisfied. Note that, when this routine is a routine that determines "whether or not the inter-cylinder air-fuel ratio imbalance state has occurred in the cylinders belonging to the right bank", Condition 5 is replaced by a condition that "the right-bank main feedback condition is satisfied".

Now, it is assumed that the value of the parameter acquisition permission flag Xkyoka is set to "1". In this case, the CPU determines "Yes" in Step 1005 and proceeds to Step 1010 to acquire a time-differential-value corresponding value (gradient) afsub by subtracting a previous left-bank detected air-fuel ratio af(L)sold from the left-bank detected air-fuel ratio abyfs(L) based on the output value Vabyfs(L) of the left-bank upstream air-fuel ratio sensor 66L at the present time point. The previous left-bank detected air-fuel ratio af(L) sold is the left-bank detected air-fuel ratio abyfs(L) acquired based on the output value Vabyfs(L) at the time point the predetermined time (4 ms, the sampling time ts) prior to the present time point. The previous left-bank detected air-fuel ratio af(L)sold is stored in the RAM. Consequently, the time-differential-value corresponding value afsub is an amount of change in the left-bank upstream air-fuel ratio abyfs(L) per predetermined time (unit time) that is 4 ms (the sampling time ts).

Note that the CPU may adopt, as the time-differential-value corresponding value (gradient) afsub, a value obtained by subtracting the output value Vabyfs(L) at the time point the predetermined time (4 ms, the sampling time ts) prior to the present time point from the output value Vabyfs(L) of the left-bank upstream air-fuel ratio sensor 66L at the present time point.

Subsequently, the CPU proceeds to Step 1015 to determine whether or not the value of the time-differential-value corresponding value afsub is equal to or larger than "0" (whether or not the value thereof is 0 or a positive value). At this point, when the value of the time-differential-value corresponding value afsub is equal to or larger than "0", the CPU determines "Yes" in Step 1015 and proceeds to Step 1020 to update a positive gradient accumulated value SumP by adding the time-differential-value corresponding value afsub to the positive gradient accumulated value SumP at this time point.

The initial value of the positive gradient accumulated value SumP is set to "0" in an initial routine. The initial routine is an initialization routine that is executed by the CPU when the position of the ignition key switch of the vehicle including the engine 10 mounted thereon is changed from the OFF position to the ON position. In addition, the positive gradient accumulated value SumP is set to "0" at every 720° crank angle rotation in Step 1055 described later. Therefore, the positive gradient accumulated value SumP is an accumulated value of the time-differential-value corresponding value afsub having a positive value among the time-differential-value corresponding values afsub obtained at intervals of constant sampling time ts during a time period from when the crank angle becomes 0° to when the crank angle reaches 720°.

Next, in Step 1025, the CPU increases the value of a positive gradient accumulation counter SumPcnt by "1". The initial value of the positive gradient accumulation counter SumPcnt is set to "0" in the above-described initial routine. Further, the value of the positive gradient accumulation counter SumPcnt is set to "0" at every 720° crank angle rotation in Step 1060 described later. Therefore, the value of the positive gradient accumulation counter SumPcnt represents the number of data items (the number of data items each indicating the magnitude of the time-differential-value corresponding value afsub) accumulated in the positive gradient accumulated value SumP. Thereafter, the CPU proceeds to Step 1040.

On the other hand, when the value of the time-differential-value corresponding value afsub is smaller than "0" (i.e., the time-differential-value corresponding value afsub is negative) at the time point at which the CPU performs the process in Step 1015, the CPU determines "No" in Step 1015 and proceeds to Step 1030 to update a negative gradient accumulated value SumM by adding "an absolute value |afsub| of the time-differential-value corresponding value afsub" to the negative gradient accumulated value SumM at this time point.

The initial value of the negative gradient accumulated value SumM is set to "0" in the above-described initial routine. Further, the negative gradient accumulated value SumM is set to "0" at every 720° crank angle rotation in Step 1060 described later. Therefore, the negative gradient accumulated value SumM is an accumulated value of the magnitude of the time-differential-value corresponding value afsub having a negative value among the time-differential-value corresponding values afsub obtained at intervals of constant sampling time ts during a time period from when the absolute crank angle becomes 0° to when the absolute crank angle reaches 720°.

Subsequently, in Step 1035, the CPU increases the value of a negative gradient accumulation counter SumMcnt by "1". The initial value of the negative gradient accumulation counter SumMcnt is set to "0" in the above-described initial routine. Further, the value of the negative gradient accumulation counter SumMcnt is set to "0" at every 720° crank angle rotation in Step 1060 described later. Therefore, the value of the negative gradient accumulation counter SumMcnt represents the number of data items (the number of data items each indicating the magnitude of the time-differential-value corresponding value afsub) accumulated in the negative gradient accumulated value SumM. Thereafter, the CPU proceeds to Step 1040.

Then, the CPU proceeds to Step 1040 to determine whether or not the absolute crank angle CA is equal to or larger than 720°. At this point, when the absolute crank angle CA is less than 720°, the CPU determines "No" in Step 1040 and proceeds directly to Step 1095 to end this routine.

On the other hand, when the absolute crank angle CA is equal to or larger than 720° at the time point at which the CPU performs the process in Step 1040, the CPU determines "Yes" in Step 1040 and proceeds to Step 1045.

In Step 1045, the CPU calculates a positive gradient average value aveP (=SumP/SumPcnt) by dividing the positive gradient accumulated value SumP by the value of the positive gradient accumulation counter SumPcnt. In addition, the CPU calculates a negative gradient average value aveM (=SumM/SumMcnt) by dividing the negative gradient accumulated value SumM by the value of the negative gradient accumulation counter SumMcnt.

Next, the CPU proceeds to Step 1050 to update an accumulated value SAveP of the positive gradient average value by adding the positive gradient average value aveP to the accumulated value SAveP of the positive gradient average value at this time point. The initial value of the accumulated value SAveP of the positive gradient average value is set to "0" in the above-described initial routine. Therefore, the accumulated value SAveP of the positive gradient average value is the accumulated value of the positive gradient average value aveP acquired after the start of the current operation of the engine 10.

Further, in Step 1050, the CPU updates an accumulated value SAveM of the negative gradient average value by adding the negative gradient average value aveM to the accumulated value SAveM of the negative gradient average value at this time point. The initial value of the accumulated value SAveM of the negative gradient average value is set to "0" in the above-described initial routine. Therefore, the accumulated value SAveM of the negative gradient average value is the accumulated value of the negative gradient average value aveM acquired after the start of the current operation of the engine 10.

Subsequently, in Step 1055, the CPU increases the value of a data counter dent by "1". The value of the data counter dent is set to "0" in the above-described initial routine. Consequently, the value of the data counter dent represents the number of data items of the positive gradient average value aveP accumulated in the accumulated value SAveP of the positive gradient average value. The value of the data counter dent also represents the number of data items of the negative gradient average value aveM accumulated in the accumulated value SAveM of the negative gradient average value.

Then, in Step 1060, the CPU sets each of the values of the positive gradient accumulated value SumP, the positive gradient accumulation counter SumPcnt, the negative gradient accumulated value SumM, and the negative gradient accumulation counter SumMcnt to "0".

Next, the CPU proceeds to Step 1065 to determine whether or not the value of the data counter dent is equal to or larger than a threshold dcntth. At this point, when the value of the data counter dent is less than the threshold dcntth, the CPU determines "No" in Step 1065 and proceeds directly to Step 1095 to end this routine. Note that the threshold dcntth is preferably equal to or larger than 2, but may be "1".

On the other hand, when the value of the data counter dent is equal to or larger than the threshold dcntth at the time point at which the CPU performs the process in Step 1065, the CPU determines "Yes" in Step 1065 and proceeds to Step 1070 to calculate a positive gradient corresponding value KmkP by dividing the accumulated value SAveP of the positive gradient average value by the data counter dent dcntth). That is, the CPU determines the average value of the positive gradient average value aveP as the positive gradient corresponding value KmkP.

At the same time, in Step 1070, the CPU calculates a negative gradient corresponding value KmkM by dividing the accumulated value SAveM of the negative gradient average value by the data counter dent (=dcntth). That is, the CPU determines the average value of the negative gradient average value aveM as the negative gradient corresponding value KmkM.

Figure 6:
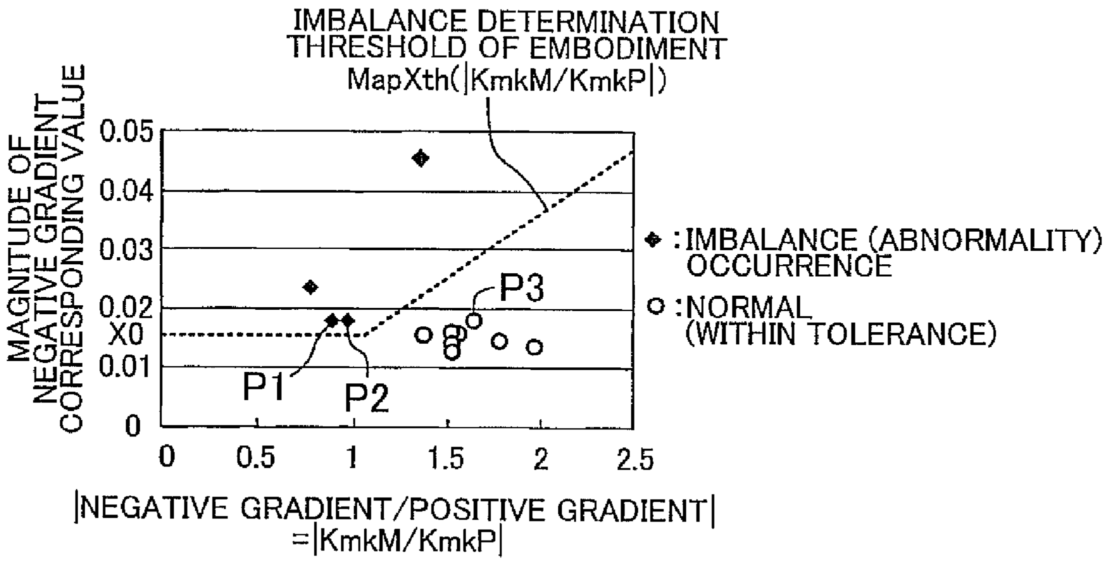
FIG. 6 is a graph having the vertical axis indicative of the magnitude of the negative gradient corresponding value of the detected air-fuel ratio and the horizontal axis indicative of the magnitude of the ratio of the negative gradient corresponding value relative to the positive gradient corresponding value of the detected air-fuel ratio (magnitude of the negative/positive gradient ratio)

Subsequently, the CPU proceeds to Step 1075 to determine an imbalance determination threshold Xth by applying "the absolute value of the ratio of the negative gradient corresponding value KmkM to the positive gradient corresponding value KmkP (the magnitude of the above-mentioned negative/positive gradient ratio) |KmkM/KmkP|" to the table MapXth (|KmkM/KmkP|) shown in FIG. 6. According to the table MapXth (|KmkM/KmkP|), the imbalance determination threshold Xth is determined so as to become larger as the absolute value of the ratio |KmkM/KmkP| becomes larger.

The inventors have found out that a cylinder that has longer time (larger crank angle) until the next discharge of exhaust gas results in the larger magnitude of the ratio of the negative gradient corresponding value to the positive gradient corresponding value (the magnitude of the negative/positive gradient ratio) |KmkM/KmkP| irrespective of the occurrence of the rich imbalance. That is, as the time (crank angle) after the discharge of exhaust gas from a cylinder until the discharge of exhaust gas from a next cylinder is longer (larger), the magnitude of the ratio of the negative gradient corresponding value to the positive gradient corresponding value relating to the cylinder becomes larger, irrespective of the occurrence of the rich imbalance. Thus, the inventors have found out that, as shown in FIG. 6, when the horizontal axis indicates the magnitude of the negative/positive gradient ratio |KmkM/KmkP| and the vertical axis indicates the magnitude of the negative gradient corresponding value KmkM, as indicated by a broken line, it is possible to set an imbalance determination threshold (see the broken line in the drawing) for differentiating between the case where the rich imbalance has occurred (see rhombic plotted points in the drawing) and the case where the rich imbalance has not occurred (see circular plotted points in the drawing).

More specifically, according to the table MapXth (|KmkM/KmkP|), when the absolute value of the ratio |KmkM/KmkP| is equal to or smaller than a predetermined value (e.g., 1), the imbalance determination threshold Xth is set to a constant value X0. In addition, according to the table MapXth (|KmkM/KmkP|), as the absolute value of the ratio |KmkM/KmkP| becomes larger within a range of the predetermined value or larger (e.g., 1 or larger), the imbalance determination threshold Xth is set so as to become gradually larger in a range of the constant value X0 or larger.

Then, the CPU proceeds to Step 1080 to adopt the negative gradient corresponding value KmkM as an imbalance determination parameter X.

Next, the CPU proceeds to Step 1085 to determine whether or not the imbalance determination parameter X is equal to or larger than "the imbalance determination threshold Xth".

At this point, when the imbalance determination parameter X is equal to or larger than the imbalance determination threshold Xth, the CPU determines "Yes" in Step 1085 and proceeds to Step 1090 to set the value of a left-bank imbalance occurrence flag XIMBL to "1". That is, the CPU determines that the inter-cylinder air-fuel ratio imbalance state has occurred in the left bank. In addition, at this point, the CPU may turn on an alarm lamp that is not shown. Note that the value of the imbalance occurrence flag XIMBL is stored in the backup RAM. Thereafter, the CPU proceeds to Step 1095 to temporarily end this routine.

In contrast to this, at the time point when the CPU performs the process in Step 1085, when the imbalance determination parameter X is less than the imbalance determination threshold Xth, the CPU determines "No" in Step 1085 and proceeds to Step 1092 to set the value of the left-bank imbalance occurrence flag XIMBL to "2". That is, the CPU stores "the determination that the inter-cylinder air-fuel ratio imbalance state has not occurred in the left bank as the result of the inter-cylinder air-fuel ratio imbalance determination". Thereafter, the CPU proceeds to Step 1095 to end this routine. In the manner described above, the inter-cylinder air-fuel ratio imbalance determination is executed.

Note that, if the value of the parameter acquisition permission flag Xkyoka is not "1" when the CPU proceeds to Step 1005, the CPU determines "No" in Step 1005 and proceeds to Step 1094. Then, the CPU sets each of the values (e.g., afsub, SumP, SumPcnt, SumM, and SumMcnt) to "0". Subsequently, the CPU proceeds to Step 1095 to end this routine. With the processes described above, it is determined whether or not the inter-cylinder air-fuel ratio imbalance state has occurred in the cylinders belonging to the left bank.

Note that, as described above, the CPU separately executes the routine that determines whether or not the inter-cylinder air-fuel ratio imbalance state has occurred in the cylinders belonging to the right bank (a right-bank determination routine). In the right-bank determination routine, the time-differential-value corresponding value (gradient) afsub is a value acquired by subtracting a previous right-bank detected air-fuel ratio af(R)sold from the right-bank detected air-fuel ratio abyfs(R) based on the output value Vabyfs(R) of the right-bank upstream air-fuel ratio sensor 66R.

As described thus far, the first determining apparatus is applied to the multi-cylinder internal combustion engine 10 including the left bank in which combustion occurs at unequal intervals and the right bank in which combustion occurs at unequal intervals. In addition, the first determining apparatus includes, in each bank, the air-fuel ratio sensor (66L, 66R), the plurality of the fuel injection valves (33), and the instructed fuel injection amount control unit (see the routine in FIG. 9) that controls the instructed fuel injection amount (Fi) such that the air-fuel ratio of the air-fuel mixture supplied to the combustion chambers of two or more cylinders belonging to the bank matches the target air-fuel ratio (abyfL, abyfR).

Further, the first determining apparatus includes the imbalance determination unit. The imbalance determination unit acquires the time-differential-value corresponding value that is the amount of change per predetermined time in the output value of the air-fuel ratio sensor or the detected air-fuel ratio that is the air-fuel ratio represented by the output value thereof (Step 1010 in FIG. 10), and acquires the positive gradient corresponding value KmkP based on the positive value of the time-differential-value corresponding value, the positive gradient corresponding value KmkP changing in accordance with (the magnitude of) the positive value (the determination of "Yes" in Step 1015, and Steps 1010, 1025, and 1040 to 1070 in FIG. 10). The imbalance determination unit acquires the negative gradient corresponding value KmkP based on the negative value of the time-differential-value corresponding value, the negative gradient corresponding value KmkP changing in accordance with the magnitude of the negative value (the determination of "No" in Step 1015, and Steps 1030, 1035, and 1040 to 1070 in FIG. 10). The imbalance determination unit determines the imbalance determination threshold based on the magnitude of the ratio of the negative gradient corresponding value to the positive gradient corresponding value, the imbalance determination threshold changing in accordance with the magnitude of the ratio (Step 1075 in FIG. 10, and FIG. 6), and determines that the inter-cylinder air-fuel ratio imbalance state has occurred when the magnitude of the negative gradient corresponding value is equal to or larger than the imbalance determination threshold and determines that the inter-cylinder air-fuel ratio imbalance state has not occurred when the magnitude of the negative gradient corresponding value is smaller than the imbalance determination threshold (Steps 1085, 1090, and 1092 in FIG. 10).

Consequently, the first determining apparatus can set the appropriate imbalance determination threshold only by determining the positive gradient corresponding value and the negative gradient corresponding value without identifying which cylinder has the fuel injection valve that causes the rich imbalance. As a result, the first determining apparatus can determine whether or not the inter-cylinder air-fuel ratio imbalance state has occurred with improved accuracy.

Second Embodiment

Next, a description is given of a determining apparatus according to a second embodiment of the invention (hereinafter simply referred to as "a second determining apparatus"). The responsiveness (air-fuel ratio responsiveness) of the output value of the air-fuel ratio sensor (the left-bank upstream air-fuel ratio sensor 66L, the right-bank upstream air-fuel ratio sensor 66R) to "the change of the air-fuel ratio" is not constant due to the individual difference and/or change of the air-fuel ratio sensor over time. When the air-fuel ratio responsiveness of the air-fuel ratio sensor is changed, the time-differential-value corresponding value afsub is changed even when the difference in the air-fuel ratio between one cylinder and another cylinder is constant. Therefore, it is not possible to determine whether or not the inter-cylinder air-fuel ratio imbalance state has occurred, with high accuracy. To cope with this, the second determining apparatus determines the imbalance determination parameter X based on the actual air-fuel ratio responsiveness of the air-fuel ratio sensor, and executes the imbalance determination based on the determined imbalance determination parameter X. Hereinbelow, a description is mainly given of this respect.

Figure 9:
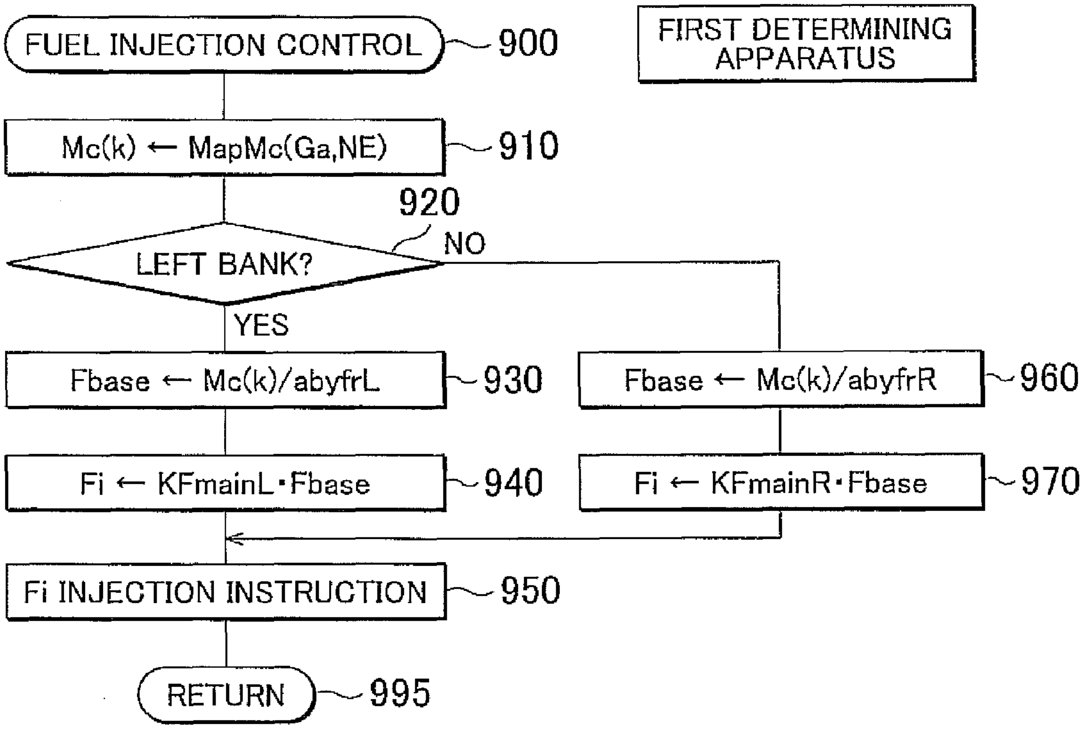
FIG. 9 is a flowchart showing a routine executed by a central processing unit (CPU) of an inter-cylinder air-fuel ratio imbalance determining apparatus according to a first embodiment of the invention (first determining apparatus)
Figure 10:
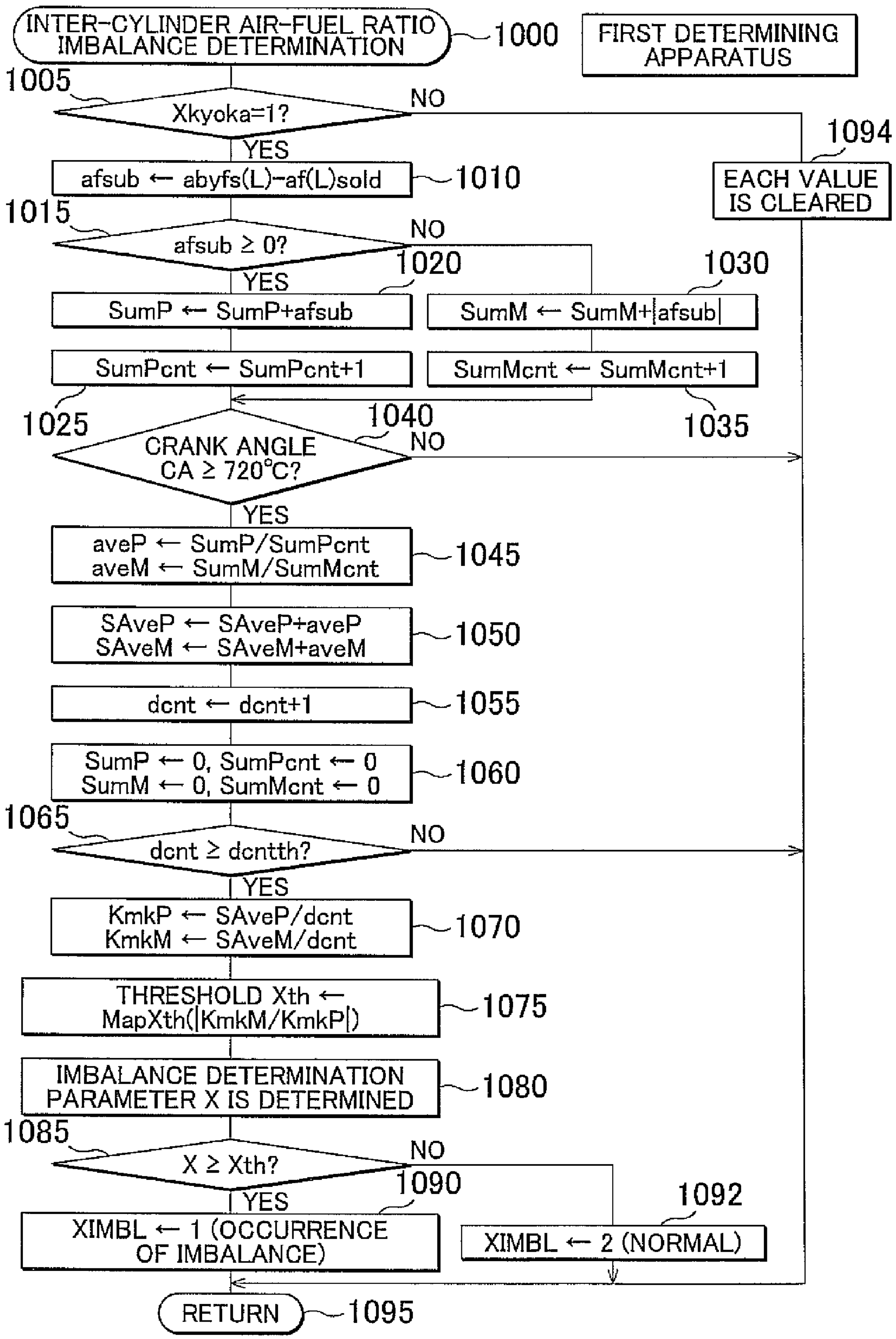
FIG. 10 is a flowchart showing a routine executed by the CPU of the first determining apparatus.
Figure 11:
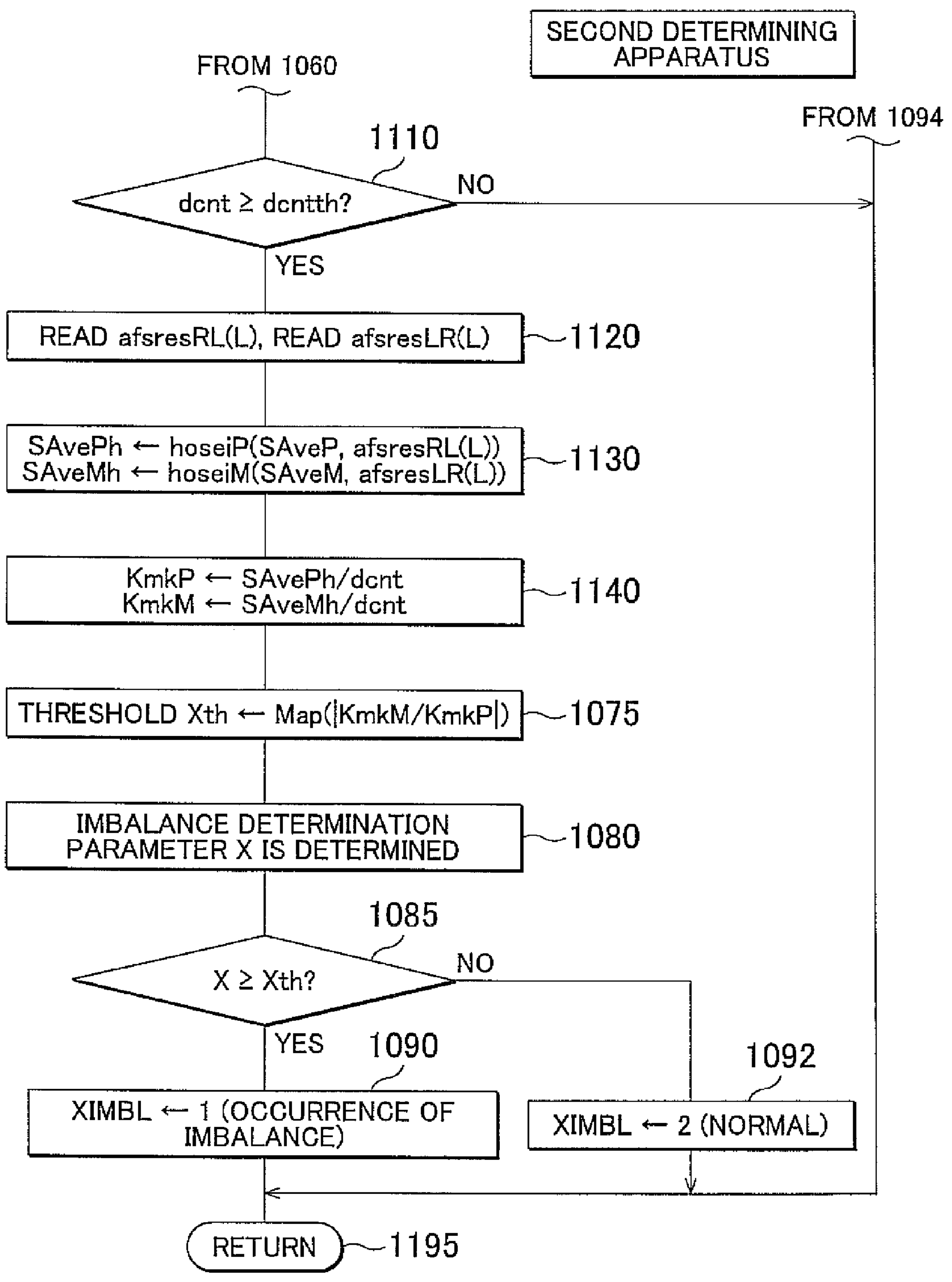
FIG. 11 is a flowchart showing a routine executed by a CPU of an inter-cylinder air-fuel ratio imbalance determining apparatus according to a second embodiment of the invention (second determining apparatus)

The CPU of the second determining apparatus executes the routine shown in FIG. 9, and also executes a routine in which "Steps 1065 to 1092 in FIG. 10" are replaced by "Steps 1110 to 1140 and Steps 1075 to 1092 in FIG. 11". Note that, in FIG. 11, Steps for performing the same processes as those of Steps shown in FIG. 10 are designated by the same reference numerals used in FIG. 10.

It is assumed that the value of the data counter dent has become equal to or larger than the threshold dcntth by the process of Step 1055 in FIG. 10. In this case, when the CPU proceeds to Step 1110 in FIG. 11 to determine that the value of the data counter dcnt has become equal to or larger than the threshold dcntth, the CPU determines "Yes" in Step 1110 and proceeds to Step 1120 to read a left-bank rich/lean responsiveness index value afsresRL(L) and a left-bank lean/rich responsiveness index value afsresLR(L) from the RAM.

Figure 12:
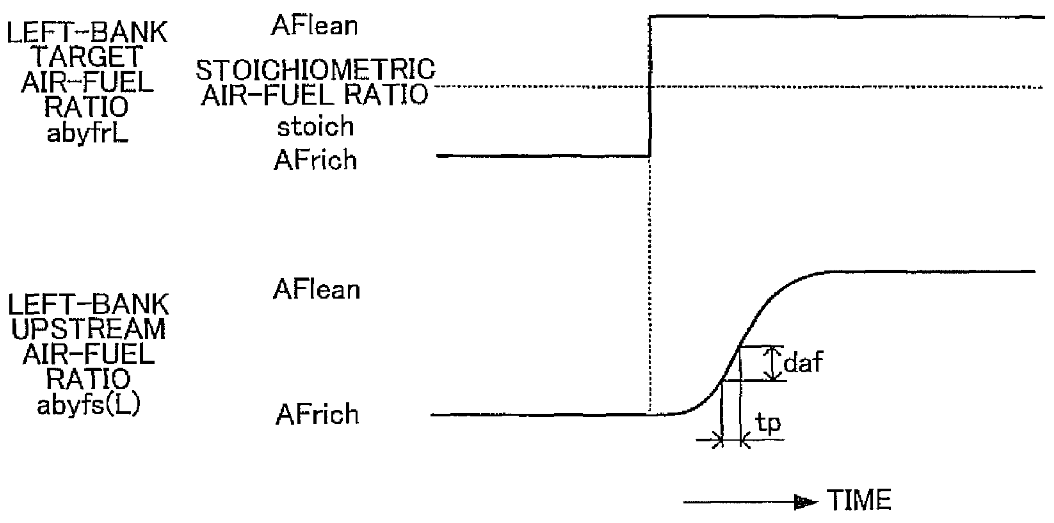
FIG. 12 is a time chart for explaining "a left-bank rich/lean responsiveness index value of a left-bank upstream air-fuel ratio sensor" acquired by the CPU of the second determining apparatus.

As shown in FIG. 12, the left-bank rich/lean responsiveness index value afsresRL(L) is a maximum value of the magnitude of "a change rate (daf/tp) of the left-bank upstream air-fuel ratio abyfs(L)" during a time period in which the value of the left-bank upstream air-fuel ratio abyfs(L) based on the output value Vabyfs(L) of the left-bank upstream air-fuel ratio sensor 66L changes from the value corresponding to a predetermined rich air-fuel ratio AFrich to the value corresponding to a predetermined lean air-fuel ratio AFlean in the case where the left-bank target air-fuel ratio abyfrL is changed from the predetermined rich air-fuel ratio AFrich to the predetermined lean air-fuel ratio AFlean. Consequently, the left-bank rich/lean responsiveness index value afsresRL (L) becomes larger as the responsiveness (the air-fuel ratio responsiveness) of the output value Vabyfs(L) of the left-bank upstream air-fuel ratio sensor 66L becomes higher in the case where the air-fuel ratio of the exhaust gas to be detected is changed from rich to lean. The left-bank rich/lean responsiveness index value afsresRL(L) is acquired by a routine (not shown) and stored in the RAM.

Figure 13:
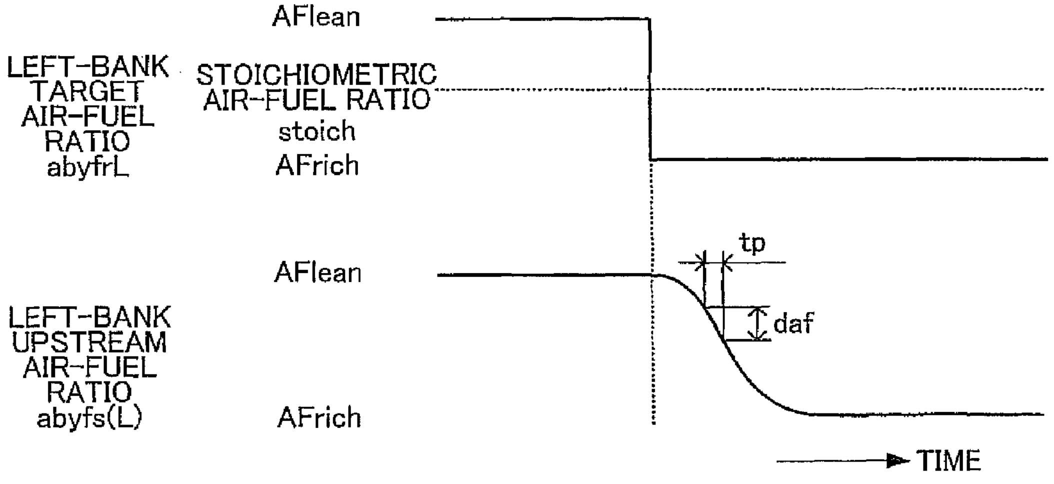
FIG. 13 is a time chart for explaining "a left-bank lean/rich responsiveness index value of the left-bank upstream air-fuel ratio sensor" acquired by the CPU of the second determining apparatus.

As shown in FIG. 13, the left-bank lean/rich responsiveness index value afsresLR(L) is a maximum value of the magnitude of "a change rate (daf/tp) of the left-bank upstream air-fuel ratio abyfs(L)" during a time period in which the value of the left-bank upstream air-fuel ratio abyfs(L) changes from the value corresponding to the lean air-fuel ratio AFlean to the value corresponding to the rich air-fuel ratio AFrich in the case where the left-bank target air-fuel ratio abyfrL is changed from the predetermined lean air-fuel ratio AFlean to the predetermined rich air-fuel ratio AFrich. Consequently, the left-bank lean/rich responsiveness index value afsresLR(L) becomes larger as the responsiveness (the air-fuel ratio responsiveness) of the output value Vabyfs(L) of the left-bank upstream air-fuel ratio sensor 66L becomes higher in the case where the air-fuel ratio of the exhaust gas to be detected is changed from lean to rich. The left-bank lean/rich responsiveness index value afsresLR(L) is acquired by a routine (not shown) and stored in the RAM.

Next, the CPU proceeds to Step 1130 in FIG. 11 to correct the accumulated value SAveP of the positive gradient average value using "the left-bank rich/lean responsiveness index value afsresRL(L)" (refer to "hoseiP(SAveP, afsresRL(L))" in Step 1130 in FIG. 11) to thereby calculate an accumulated value SAvePh of the positive gradient average value after correction. More specifically, the CPU determines, as "the accumulated value SAvePh of the positive gradient average value after correction", the value obtained by correcting the accumulated value SAveP of the positive gradient average value such that the accumulated value SAveP of the positive gradient average value becomes smaller as the left-bank rich/lean responsiveness index value afsresRL(L) becomes larger within a range larger than a standard value (i.e., as the air-fuel ratio responsiveness of the air-fuel ratio sensor 66L becomes higher when the air-fuel ratio is changed from rich to lean). Further, the CPU determines, as "the accumulated value SAvePh of the positive gradient average value after correction", the value obtained by correcting the accumulated value SAveP of the positive gradient average value such that the accumulated value SAveP of the positive gradient average value becomes larger as the left-bank rich/lean responsiveness index value afsresRL(L) becomes smaller within a range smaller than the standard value (i.e., as the air-fuel ratio responsiveness of the air-fuel ratio sensor 66L becomes lower when the air-fuel ratio is changed from rich to lean).

At the same time, in Step 1130, the CPU corrects the accumulated value SAveM of the negative gradient average value using "the left-bank lean/rich responsiveness index value afsresLR(L)" (refer to "hoseiM(SAveM, afsresLR(L))" in Step 1130 in FIG. 11) to thereby calculate an accumulated value SAveMh of the negative gradient average value after correction. More specifically, the CPU determines, as "the accumulated value SAveMh of the negative gradient average value after correction", the value obtained by correcting the accumulated value SAveM of the negative gradient average value such that the absolute value (magnitude) of the accumulated value SAveM of the negative gradient average value becomes smaller as the left-bank lean/rich responsiveness index value afsresLR(L) becomes larger within a range larger than a standard value (i.e., as the air-fuel ratio responsiveness of the air-fuel ratio sensor 66L becomes higher when the air-fuel ratio is changed from lean to rich). Further, the CPU determines, as "the accumulated value SAveMh of the negative gradient average value after correction", the value obtained by correcting the accumulated value SAveM of the negative gradient average value such that the absolute value of the accumulated value SAveM of the negative gradient average value becomes larger as the left-bank lean/rich responsiveness index value afsresLR(L) becomes smaller within a range smaller than the standard value (i.e., as the air-fuel ratio responsiveness of the air-fuel ratio sensor 66L becomes smaller when the air-fuel ratio is changed from lean to rich).

Subsequently, the CPU proceeds to Step 1140 to calculate the positive gradient corresponding value KmkP by dividing the accumulated value SAvePh of the positive gradient average value after correction by the data counter dent (=dcntth). In addition, in Step 1140, the CPU calculates the negative gradient corresponding value KmkM by dividing the accumulated value SAveMh of the negative gradient average value after correction by the data counter dent.

Thereafter, the CPU executes the processes of Steps 1075 to 1085 to determine whether or not the inter-cylinder air-fuel ratio imbalance state has occurred among the cylinders of the left bank.

Note that, when the value of the data counter dent is less than the threshold dcntth at the time point at which the CPU executes the process of Step 1110, the CPU determines "No" in Step 1110 and proceeds directly to Step 1195 to end this routine.

Further, the CPU also performs the processes similar to those in FIG. 11 on the right bank. That is, the CPU determines a right-bank rich/lean responsiveness index value afsresRL(R) and a right-bank lean/rich responsiveness index value afsresLR(R) of the right-bank upstream air-fuel ratio sensor 66R, corrects, based on the determined values, "the accumulated value SAveP of the right-bank positive gradient average value and the accumulated value SAveM of the right-bank negative gradient average value", and calculates, based on the corrected values, the right-bank imbalance determination parameter X and imbalance determination threshold Xth. Subsequently, the CPU determines, by using these values, whether or not the inter-cylinder air-fuel ratio imbalance state has occurred among the cylinders of the right bank.

As described thus far, the second determining apparatus determines the positive gradient corresponding value KmkP and the negative gradient corresponding value KmkM taking into account the responsiveness of the air-fuel ratio sensor. As a result, even when the responsiveness of the air-fuel ratio sensor is lowered, it is possible to perform the inter-cylinder air-fuel ratio imbalance determination with high accuracy.

The invention is not limited to the above-described embodiments, and various modifications can be adopted within the scope of the invention. For example, the invention is not limited to the V8 engine, and the invention can be applied to any engine as long as in the engine, discharge intervals are unequal in the group of (three or more, and further preferably four to six) cylinders that discharge exhaust gas reaching an upstream air-fuel ratio sensor.

In addition, although the absolute value |afsub| of the time-differential-value corresponding value afsub is accumulated in Step 1030 in FIG. 10 in the above-described embodiment, the time-differential-value corresponding value afsub may be accumulated in Step 1030. In this case, in Step 1070 in FIG. 10, the absolute value of the value obtained by dividing the accumulated value SAveM of the negative gradient average value by the data counter dcnt (=dcntth) may be adopted as the negative gradient corresponding value KmkM.

Further, as shown in FIG. 12, the left-bank rich/lean responsiveness index value afsresRL(L) may be a value based on time (e.g., the reciprocal of the time) required for the left-bank upstream air-fuel ratio abyfs(L) based on the output value Vabyfs(L) of the left-bank upstream air-fuel ratio sensor 66L to change from the value corresponding to the rich air-fuel ratio AFrich to "a predetermined air-fuel ratio between the rich air-fuel ratio AFrich and the lean air-fuel ratio AFlean" when the left-bank target air-fuel ratio abyfrL is changed from the predetermined rich air-fuel ratio AFrich to the predetermined lean air-fuel ratio AFlean. The right-bank rich/lean responsiveness index value afsresRL(R) can be acquired in the same manner.

Furthermore, as shown in FIG. 13, the left-bank lean/rich responsiveness index value afsresLR(L) may be a value based on time (e.g., the reciprocal of the time) required for the left-bank upstream air-fuel ratio abyfs(L) to change from the value corresponding to the lean air-fuel ratio AFlean to "a predetermined air-fuel ratio between the lean air-fuel ratio AFlean and the rich air-fuel ratio AFrich" when the left-bank target air-fuel ratio abyfrL is changed from the predetermined lean air-fuel ratio AFlean to the predetermined rich air-fuel ratio AFrich. The right-bank lean/rich responsiveness index value afsresLR(R) can be acquired in the same manner.

What is claimed is:

1. An inter-cylinder air-fuel ratio imbalance determining apparatus for an internal combustion engine, which is applied to a multi-cylinder internal combustion engine including a plurality of cylinders in which combustion occurs at unequal intervals, the inter-cylinder air-fuel ratio imbalance determining apparatus comprising:

an air-fuel ratio sensor disposed at a portion of an exhaust passage of the engine, the portion being an exhaust collection portion where exhaust gas discharged from at least two of the plurality of cylinders is collected, or being downstream of the exhaust collection portion, and the air-fuel ratio sensor being configured to output an output value corresponding to an air-fuel ratio of the exhaust gas passing through the portion at which the air-fuel ratio sensor is disposed;

a plurality of fuel injection valves each of which is disposed for a corresponding one of the at least two of the cylinders, and configured to inject fuel to be contained in an air-fuel mixture supplied to a combustion chamber of the corresponding one of the at least two of the cylinders, the fuel being injected in an amount corresponding to an instructed fuel injection amount;

an instructed fuel injection amount control unit configured to control the instructed fuel injection amount such that an air-fuel ratio of the air-fuel mixture supplied to the combustion chamber of each of the at least two of the cylinders matches a target air-fuel ratio; and an imbalance determination unit configured: (i) to acquire a time-differential-value corresponding value that is an amount of change per predetermined time in the output value of the air-fuel ratio sensor or a detected air-fuel ratio that is an air-fuel ratio represented by the output value; (ii) to acquire a positive gradient corresponding value based on a positive value of the time-differential-value corresponding value, the positive gradient corresponding value changing in accordance with a magnitude of the positive value; (iii) to acquire a negative gradient corresponding value based on a negative value of the time-differential-value corresponding value, the negative gradient corresponding value changing in accordance with a magnitude of the negative value; (iv) to determine an imbalance determination threshold based on a magnitude of a ratio of the negative gradient corresponding value to the positive gradient corresponding value, the imbalance determination threshold changing in accordance with the magnitude of the ratio; (v) to determine that an inter-cylinder air-fuel ratio imbalance state has occurred when a magnitude of the negative gradient corresponding value is equal to or larger than the imbalance determination threshold; and (vi) to determine that the inter-cylinder air-fuel ratio imbalance state has not occurred when the magnitude of the negative gradient corresponding value is smaller than the imbalance determination threshold.

2. The inter-cylinder air-fuel ratio imbalance determining apparatus according to claim 1, wherein the imbalance determination unit is configured to determine the imbalance determination threshold such that the imbalance determination threshold becomes larger as the magnitude of the ratio of the negative gradient corresponding value to the positive gradient corresponding value becomes larger.

3. The inter-cylinder air-fuel ratio imbalance determining apparatus according to claim 1, wherein the imbalance determination unit is configured to acquire the positive gradient corresponding value taking into account a rich/lean responsiveness index value that indicates responsiveness of the air-fuel ratio sensor in a case where the target air-fuel ratio is changed from a predetermined rich air-fuel ratio to a predetermined lean air-fuel ratio, and to acquire the negative gradient corresponding value taking into account a lean/rich responsiveness index value that indicates responsiveness of the air-fuel ratio sensor in a case where the target air-fuel ratio is changed from the predetermined lean air-fuel ratio to the predetermined rich air-fuel ratio.

4. The inter-cylinder air-fuel ratio imbalance determining apparatus according to claim 3, wherein the rich/lean responsiveness index value is a maximum value of a magnitude of a change rate of the detected air-fuel ratio during a period in which the detected air-fuel ratio changes from a value corresponding to the predetermined rich air-fuel ratio to a value corresponding to the predetermined lean air-fuel ratio in the case where the target air-fuel ratio is changed from the predetermined rich air-fuel ratio to the predetermined lean air-fuel ratio, and the lean/rich responsiveness index value is a maximum value of the magnitude of the change rate of the detected air-fuel ratio during a period in which the detected air-fuel ratio changes from the value corresponding to the predetermined lean air-fuel ratio to the value corresponding to the predetermined rich air-fuel ratio in the case where the target air-fuel ratio is changed from the predetermined lean air-fuel ratio to the predetermined rich air-fuel ratio.

* * * * *